US010689495B2

(12) United States Patent
Mueller et al.

(10) Patent No.: US 10,689,495 B2
(45) Date of Patent: Jun. 23, 2020

(54) LIGHT STABILIZED POLYOLEFIN FILMS, TAPES AND MONOFILAMENTS

(71) Applicant: BASF SE, Ludwigshafen (DE)

(72) Inventors: Daniel Mueller, Basel (CH); Tania Weyland, Widensolen (FR)

(73) Assignee: BASF SE, Ludwigshafen (DE)

( * ) Notice: Subject to any disclaimer, the term of this patent is extended or adjusted under 35 U.S.C. 154(b) by 281 days.

(21) Appl. No.: 15/551,943

(22) PCT Filed: Feb. 16, 2016

(86) PCT No.: PCT/EP2016/053206
§ 371 (c)(1),
(2) Date: Aug. 18, 2017

(87) PCT Pub. No.: WO2016/131791
PCT Pub. Date: Aug. 25, 2016

(65) Prior Publication Data
US 2018/0030222 A1 Feb. 1, 2018

(30) Foreign Application Priority Data
Feb. 20, 2015 (EP) .................................... 15155952

(51) Int. Cl.
*C08J 5/18* (2006.01)
*D01F 1/10* (2006.01)
*B29C 48/08* (2019.01)
*B29C 48/88* (2019.01)
(Continued)

(52) U.S. Cl.
CPC ................. *C08J 5/18* (2013.01); *B29C 48/08* (2019.02); *B29C 48/919* (2019.02); *C08K 5/34* (2013.01); *D01F 1/10* (2013.01); *B29K 2023/06* (2013.01); *B29K 2023/12* (2013.01); *C08J 2323/06* (2013.01); *C08J 2323/12* (2013.01); *C08K 2201/014* (2013.01)

(58) Field of Classification Search
None
See application file for complete search history.

(56) References Cited

U.S. PATENT DOCUMENTS 4,086,204 A 4/1978 Cassandrini et al.
4,108,829 A 8/1978 Cassandrini et al.
4,233,412 A 11/1980 Rody et al.
(Continued)

FOREIGN PATENT DOCUMENTS

CA 2 299 754 A1 2/2000
DE 43 16 611 A1 11/1993
(Continued)

OTHER PUBLICATIONS

Extended European Search Report dated Mar. 21, 2019 in Patent Application No. 18201146.0, 3 pages.
(Continued)

*Primary Examiner* — Jacob T Minskey
(74) *Attorney, Agent, or Firm* — Oblon, McClelland, Maier & Neustadt, L.L.P.

(57) ABSTRACT

A process for reducing water carry-over of a light stabilized polyolefin film, tape or filament which contains component (A) as light stabilizer and which is passed through a water bath during production, characterized in that the polyolefin film, tape or monofilament additionally comprises component (B) as light stabilizer, an example of component (A) is (I) wherein $E_1$ is (II), $E_2$ is (III) and $a_3$ is a number from 2 to 10, and an example of component (B) is (IV).

(I)

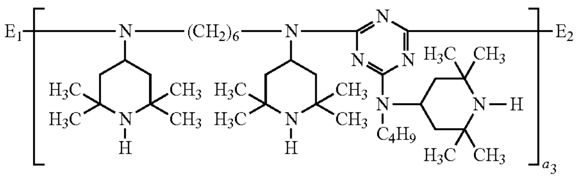

(II)

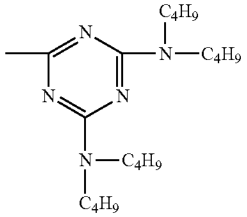

(III)

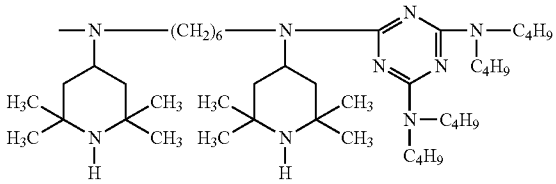

(IV)

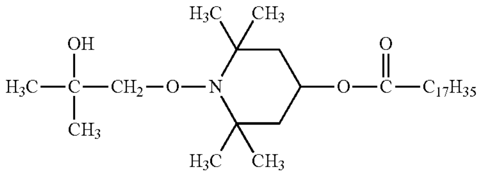

15 Claims, No Drawings

(51) Int. Cl.
*C08K 5/34* (2006.01)
*B29K 23/00* (2006.01)

(56) References Cited

U.S. PATENT DOCUMENTS

| | | | | |
|---|---|---|---|---|
| 4,325,863 | A | 4/1982 | Hinsken et al. | |
| 4,331,586 | A | 5/1982 | Hardy | |
| 4,338,244 | A | 7/1982 | Hinsken et al. | |
| 4,477,615 | A | 10/1984 | Raspanti et al. | |
| 5,006,587 | A | 4/1991 | Fielding | |
| 5,175,312 | A | 12/1992 | Dubs et al. | |
| 5,216,052 | A | 6/1993 | Nesvadba et al. | |
| 5,252,643 | A | 10/1993 | Nesvadba | |
| 5,844,026 | A | 12/1998 | Galbo et al. | |
| 6,046,304 | A | 4/2000 | Borzatta et al. | |
| 6,117,995 | A | 9/2000 | Zedda et al. | |
| 6,297,299 | B1 | 10/2001 | Borzatta et al. | |
| 6,388,072 | B2 | 5/2002 | Galbo et al. | |
| 6,420,462 | B1 | 7/2002 | Zedda et al. | |
| 6,677,451 | B2 | 1/2004 | Zedda et al. | |
| 2005/0239944 | A1 | 10/2005 | Zah et al. | |
| 2005/0250889 | A1* | 11/2005 | Malik | C08K 5/13 524/287 |
| 2012/0111407 | A1 | 5/2012 | Rummens | |

FOREIGN PATENT DOCUMENTS

| | | | | | |
|---|---|---|---|---|---|
| DE | 43 16 622 | A1 | | 11/1993 | |
| DE | 43 16 876 | A1 | | 11/1993 | |
| EP | 0 589 839 | A1 | | 3/1994 | |
| EP | 0 591 102 | A1 | | 4/1994 | |
| EP | 1 038 912 | A2 | | 9/2000 | |
| EP | 1 291 384 | A1 | | 3/2003 | |
| EP | 2 277 694 | A1 | | 1/2011 | |
| GB | 2 262 472 | A | | 6/1993 | |
| RU | 2 243 216 | C2 | | 12/2004 | |
| RU | 2 263 688 | C2 | | 11/2005 | |
| WO | 95/00313 | A1 | | 1/1995 | |
| WO | 03/097722 | A1 | | 11/2003 | |
| WO | WO-03097722 | A1 | * | 11/2003 | C08J 5/18 |

OTHER PUBLICATIONS

International Search Report and Written Opinion dated Apr. 19, 2016 in corresponding PCT/EP2016/053206 filed Feb. 16, 2016.

Extended Search Report dated Jun. 29, 2015 in European Patent Application No. 15155952.3.

International Search Report dated Apr. 19, 2016 in PCT/EP2016/053206 filed Feb. 16, 2016.

Cangelosi, et al., "UV Stabilizers", Encyclopedia of Polymer Science and Technology, vol. 8, Jul. 15, 2002, pp. 269-310.

* cited by examiner

LIGHT STABILIZED POLYOLEFIN FILMS, TAPES AND MONOFILAMENTS

The present invention relates to a process for the reduction of water carry-over of a light stabilized polyolefin film, tape or monofilament which is passed through a water bath during production, to the polyolefin film, tape or monofilament made in accordance to that process and to the use of specific light stabilizers to reduce the water carry-over of a light stabilized polyolefin film, tape or monofilament.

A widespread method for producing polyolefin films, tapes or monofilaments consists in extruding the polymer melt through a suitable apparatus and, in the form of a film, tape or monofilament, into a water bath, where the film, tape or monofilament is cooled and solidified. The film, tape or monofilament may then in turn be passed out of the water bath and subjected to further steps of processing. On emerging from the water bath the film, tape or monofilament can entrain water, which interferes with subsequent steps of processing. This effect, the entrainment of water from the water bath, is often termed “water carry-over” in the technical literature, and this can be abbreviated to WCO.

Stretching of the film at a suitable temperature results in orientation and further crystallization of the polymer, resulting in the specific properties. This second step of processing may take place directly on the film, but the primary film is often split into tapes prior to the stretching process. Since the desired properties are obtained during the stretching process, precise adherence to all process parameters is essential here. Even traces of moisture on the film or on the tapes prior to the stretching process alter the subsequent stretching and orientation so as to produce very severe variations in the quality of the product obtained. The effects of this go beyond merely the corresponding major variations in the quality of the resultant final product. Even during production or processing, the poor quality can cause break-offs of the tapes, for example, and thus stop production. A source of water which can lead to the problems mentioned is the cooling bath into which the primary film is extruded. Although most plastics, in particular the polyolefins, such as polyethylene (PE) or polypropylene (PP) are very hydrophobic and therefore have little tendency to absorb water, it is frequently found that at relatively high production speeds water droplets or a thin film of water adhere to the film when this is drawn over the water bath. In addition, various additives such as light stabilizers have to be added to the polymer to ensure that the final product has good functionality. Some of these additives contribute to increased entrainment of water from the water bath. The additives, and also a maximum processing speed, are essential if suitable products are to be produced at low cost. A reduction in processing speed leads to uneconomic production. The addition of necessary additives, some of which lead to a worsening of WCO (i.e. more WCO and therefore poorer product) is also impossible to avoid, because otherwise the product properties brought about by the additives cannot be achieved.

The reduction of WCO is currently promoted via simple design measures during machinery manufacture. For example, the draw-off of the film from the water bath is usually vertically upward, so that gravity alone maximizes the amount of water dropping away. In addition, use is often made of squeeze rollers and/or air knives to remove the maximum amount of water from the film. There are other technical methods, depending on the specific configuration of the machine.

There continues to be a requirement for a process for improving WCO during the production of polyolefin films, tapes and monofilaments. Ideally, no undesirable side-effects should arise, and the process should also be capable of problem-free use for existing formulations.

Surprisingly, it has now been found that the addition of a specific second sterically hindered amine light stabilizer to a light stabilized polyolefin film, tape or monofilament which contain already a sterically hindered amine light stabilizer can markedly reduce WCO during the production. This is unexpected particularly because the two sterically hindered amines belong to the same class of compounds. It was completely surprising and in no way predictable that particular combinations of two sterically hindered amine light stabilizers show a synergistic improvement in WCO properties.

The invention therefore provides a process for reducing water carry-over of a light stabilized polyolefin film (preferably monolayer), tape (preferably monolayer) or monofilament which contains component (A) as light stabilizer and which is passed through a water bath during production, characterized in that the polyolefin film, tape or monofilament additionally comprises component (B) as light stabilizer, component (A) is at least one compound selected from the group consisting of compounds of the formula (A-I), compounds of the formula (A-II) and compounds of the formula (A-III), (A-1)

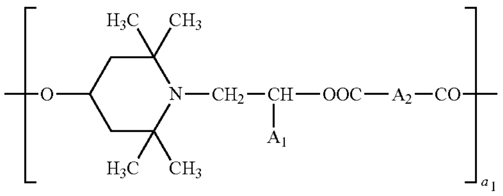

wherein $A_1$ is hydrogen or $C_1$-$C_4$alkyl, $A_2$ is a direct bond or $C_1$-$C_{10}$alkylene, and $a_1$ is a number from 2 to 20;

(A-II)

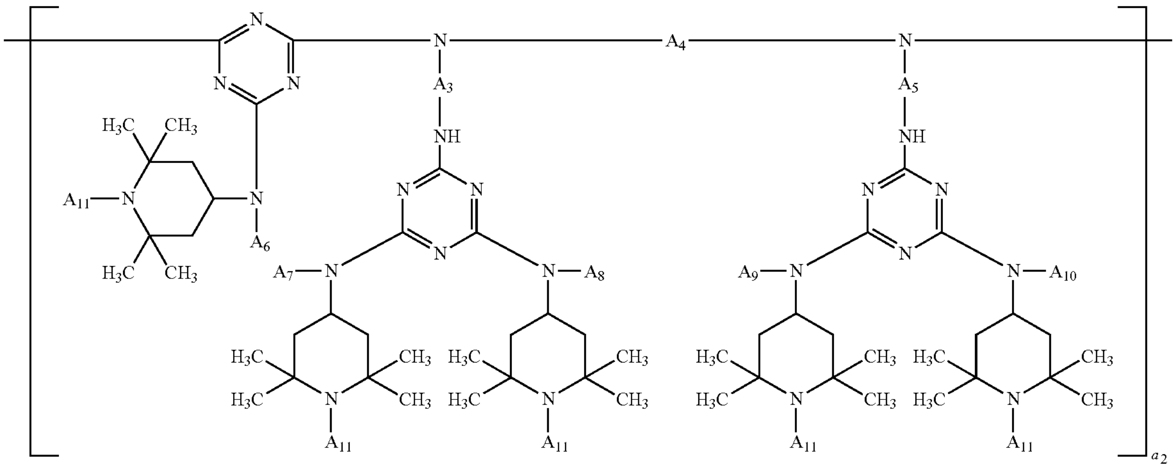

wherein $A_3$, $A_4$ and $A_5$ independently of one another are $C_2$-$C_{18}$alkylene, $A_6$, $A_7$, $A_8$, $A_9$ and $A_{10}$ independently of one another are hydrogen, $C_1$-$C_{12}$alkyl, $C_5$-$C_{12}$cycloalkyl or a group of the formula (a-1), (a-1)

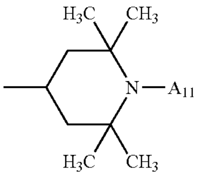

the radicals $A_{11}$ independently of one another are hydrogen, $C_1$-$C_{12}$alkyl or $C_5$-$C_{12}$cycloalkyl, and $a_2$ is a number from 1 to 20;

(A-III)

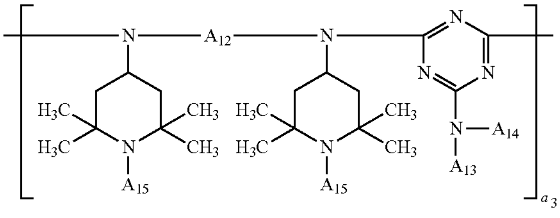

wherein $A_{12}$ is $C_2$-$C_{18}$alkylene, $C_5$-$C_7$cycloalkylene or $C_1$-$C_4$alkylenedi($C_5$-$C_7$cycloalkylene), $A_{13}$ and $A_{14}$ independently of one another are hydrogen, $C_1$-$C_{12}$alkyl, $C_5$-$C_{12}$cycloalkyl or a group of the formula (a-2), (a-2)

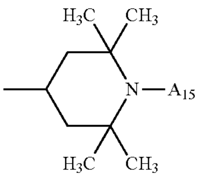

or the radicals $A_{13}$ and $A_{14}$, together with the nitrogen atom to which they are bonded, form a 5- to 10-membered heterocyclic ring, the radicals $A_{15}$ independently of one another are hydrogen, $C_1$-$C_{12}$alkyl or $C_5$-$C_{12}$cycloalkyl, and $a_3$ is a number from 2 to 20;

component (B) is at least one compound selected from the group consisting of compounds of the formula (B-I), compounds of the formula (B-II), compounds of the formula (B-III) and compounds of the formula (B-IV), (B-I)

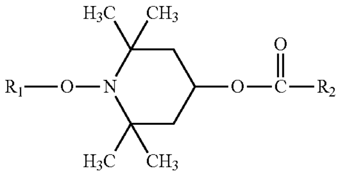

wherein $R_1$ is $C_1$-$C_{18}$alkyl, $C_1$-$C_{18}$hydroxyalkyl, cyclohexyl or hydroxycyclohexyl or $R_1$ is a group —$C(C_6H_5)(H)CH_2$—OH and $R_2$ is $C_1$-$C_{25}$alkyl or a group of the formula (b-1);

(b-1)

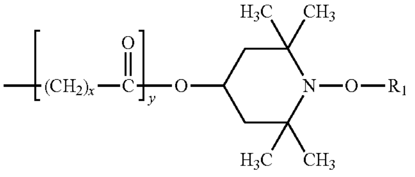

wherein x is an integer from 2 to 8 and y is zero or 1;

(B-II)

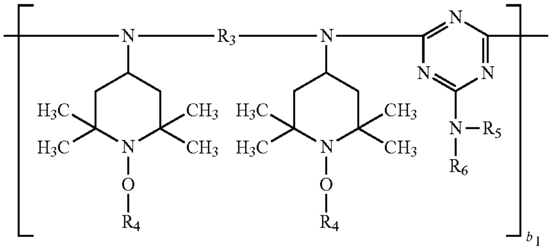

wherein $R_3$ is $C_2$-$C_{18}$alkylene, $C_5$-$C_7$cycloalkylene or $C_1$-$C_4$alkylenedi($C_5$-$C_7$cycloalkylene), the radicals $R_4$ independently of one another are $C_1$-$C_{12}$alkyl or $C_5$-$C_{12}$cycloalkyl, $R_5$ and $R_6$ independently of one another are hydrogen, $C_1$-$C_{12}$alkyl, $C_5$-$C_{12}$cycloalkyl or a group of the formula (b-2), (b-2)

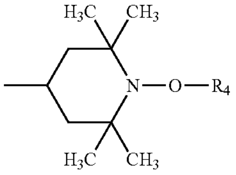

or the radicals $R_5$ and $R_6$, together with the nitrogen atom to which they are bonded, form a 5- to 10-membered heterocyclic ring and $b_1$ is a number from 1 to 20;

(B-III)

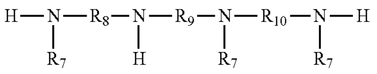

wherein the radicals $R_8$, $R_9$ and $R_{10}$ independently of one another are $C_2$-$C_{18}$alkylene and the radicals $R_7$ independently of one another are a group of the formula (b-3)

(b-3)

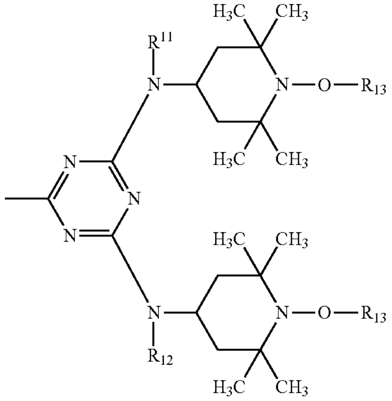

wherein $R_{11}$ and $R_{12}$ independently of one another are hydrogen, $C_1$-$C_{12}$alkyl, $C_5$-$C_{12}$cycloalkyl or a group of the formula (b-4)

(b-4)

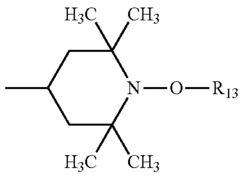

and the radicals $R_{13}$ independently of one another are $C_1$-$C_{12}$alkyl or $C_5$-$C_{12}$cycloalkyl;

(B-IV)

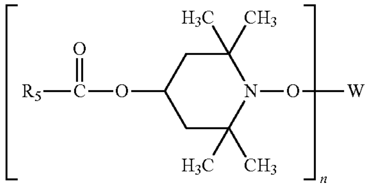

wherein $R_5$ is $C_1$-$C_{25}$alkyl, n is a number from 1 to 10, and

W is a wax residue comprising between 50 and 1000 carbon atoms, preferably a residue of a polyethylene or polypropylene wax.

Components (A) and (B) are preferably in one layer, if the film is a multilayer film.

The compounds of components (A) and (B) are known and largely commercially available and can be prepared according to known methods.

The compounds of component (A) can be prepared for example in analogy to the methods described in U.S. Pat. Nos. 4,233,412, 4,477,615 (CAS 136,504-96-6) and U.S. Pat. Nos. 4,108,829, 4,086,204, 4,331,586, 6,046,304 and 6,297,299.

The compounds of component (B) can be prepared for example in analogy to the methods described in U.S. Pat. Nos. 6,388,072, 6,117,995, 6,420,462 and 6,677,451, and 5,844,026.

Preferred compounds of component (A) are the commercial products Tinuvin®622, Sabostab® UV 119, Uvasorb®

HA88, Uvasorb® HA10, Chimassorb®944, Chimassorb®2020, Cyasorb® UV 3346, Cyasorb® UV 3529 and Dastib®1082.

Preferred compounds of component (B) are the commercial products Tinuvin® NOR 371, Tinuvin®123, ADK STAB® LA81 or Flamestab® NOR 116.

The polyolefin is preferably a polyethylene or a polypropylene and contains for example 0.01 to 10%, in particular 0.1 to 1%, relative to the weight of the polyolefin, of the sum of components (A) and (B).

The weight ratio of component (A) to component (B) is for example 1:20 to 20:1, preferably 1:15 to 15:1.

The meanings of the terminal groups which saturate the free valences in the compounds of the formulae (A-I), (A-II), (A-III) and (B-II) depend on the processes used for their preparation. The terminal groups can also be modified after the preparation of the compounds.

If the compounds of the formula (A-I) are prepared, for example, by reacting a compound of the formula

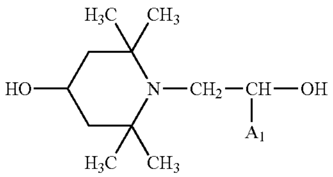

in which $A_1$ is hydrogen or methyl, with a dicarboxylic acid diester of the formula $Y_0$—OOC-$A_2$-COO—$Y_0$, in which $Y_0$ is, for example, methyl, ethyl or propyl, and $A_2$ is as defined above, the terminal group bonded to the 2,2,6,6-tetramethyl-4-oxypiperidin-1-yl radical is hydrogen or —CO-$A_2$-COO—$Y_0$, and the terminal group bonded to the diacyl radical is —O—$Y_0$ or

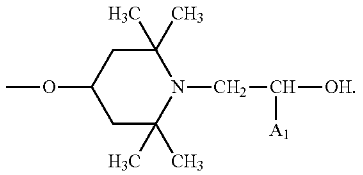

In the compounds of the formula (A-II) the terminal groups bonded to the triazine radical is, for example, Cl or a group

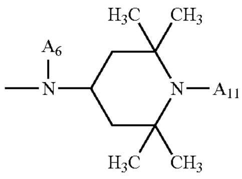

and the terminal group bonded to the amino radical is, for example, hydrogen or a

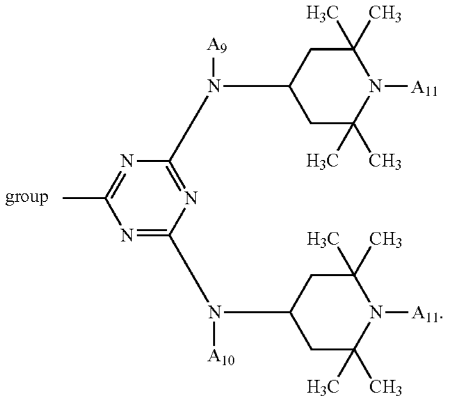

If the compounds of the formula (A-III) are prepared by reacting a compound of the formula

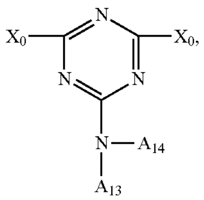

in which $X_0$ is, for example, halogen, in particular chlorine, and $A_{13}$ and $A_{14}$ are as defined above, with a compound of the formula

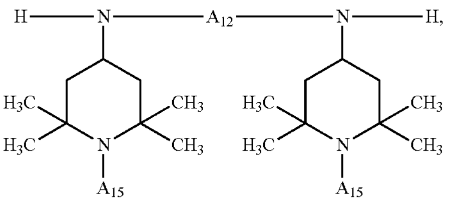

in which $A_{12}$ and $A_{15}$ are as defined above, the terminal group bonded to the diamino radical is for example hydrogen or

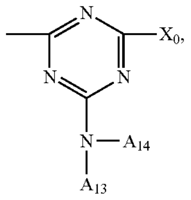

and the terminal group bonded to the triazine radical is for example $X_0$ or

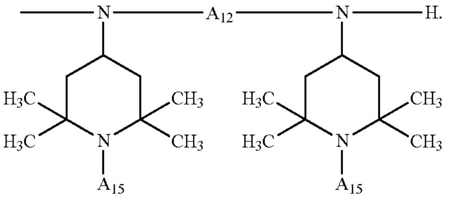

If $X_0$ is halogen, it is advantageous to replace this, for example, by —OH or an amino group when the reaction is complete. Examples of amino groups which may be mentioned are pyrrolidin-1-yl, morpholino, —$NH_2$, —$N(C_1$-$C_8)$ alkyl)$_2$ and —$NR_0(C_1$-$C_0$alkyl), in which $R_0$ is hydrogen or a group of the formula (a-2).

One of the particularly preferred compounds of the formula (A-III) is

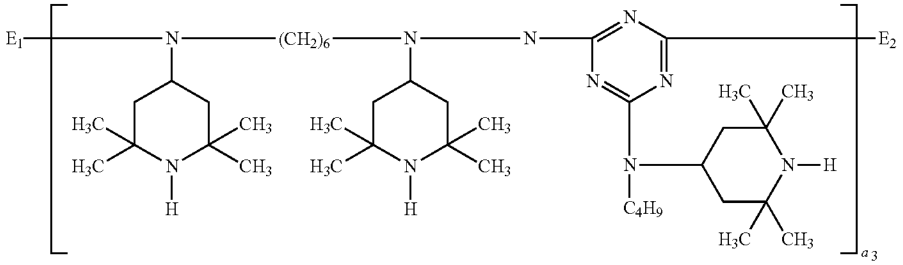

wherein $E_1$ is

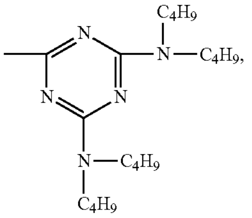

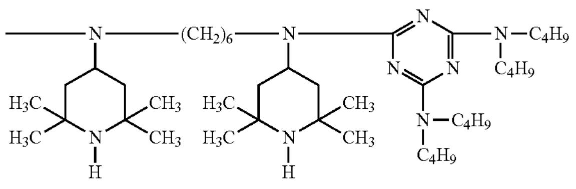

and $a_3$ is a number from 2 to 10.

The preparation of this compound is described in Example 10 of U.S. Pat. No. 6,046,304.

In the compounds of the formula (B-II), the end group bonded to the diamino radical is for example hydrogen or

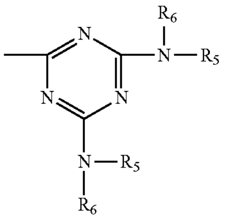

and the terminal group bonded to the triazine radical is for example

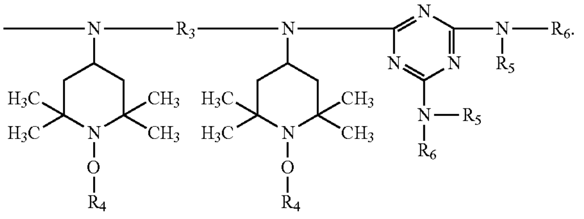

Examples of alkyl having up to 25 carbon atoms are methyl, ethyl, propyl, isopropyl, n-butyl, sec-butyl, isobutyl, tert-butyl, 2-ethylbutyl, n-pentyl, isopentyl, 1-methyl¬ pentyl, 1,3-dimethyl¬ butyl, n-hexyl, 1-methyl¬ hexyl, n-heptyl, isoheptyl, 1,1,3,3-tetra¬ imethyl¬ butyl, 1-methyl¬ heptyl, 3-methyl¬ heptyl, n-octyl, 2-ethyl¬ hexyl, 1,1,3-tri¬ methyl-hexyl, 1,1,3,3-tetra¬ methyl¬ pentyl, nonyl, decyl, undecyl, 1-methyl¬ undecyl, dodecyl, 1,1,3,3,5,5-hexa¬ methyl¬ hexyl, tridecyl, tetradecyl, pentadecyl, hexadecyl, heptadecyl and octadecyl.

Examples of $C_5$-$C_{12}$cycloalkyl are cyclopentyl, cyclohexyl, cycloheptyl, cyclooctyl and cyclododecyl. Cyclohexyl is preferred.

Examples of alkylene having up to 18 carbon atoms are methylene, ethylene, propylene, trimethylene, tetramethylene, pentamethylene, 2,2-dimethyltrimethylene, hexamethylene, decamethylenen and octadecamethylene.

A preferred example of $C_5$-$C_7$cycloalkylene is cyclohexylene.

A preferred example of $C_1$-$C_4$alkylenedi($C_5$-$C_7$cycloalkylene) is cyclohexylene-methylene-cyclohexylene.

A preferred example of a 5- to 7-membered heterocyclic ring is a morpholine group.

In a preferred process $A_1$ is hydrogen, $A_2$ is $C_2$-$C_6$alkylene, and $a_1$ is a number from 2 to 10;

$A_3$, $A_4$ and $A_5$ independently of one another are $C_2$-$C_6$alkylene, $A_6$, $A_7$, $A_8$, $A_9$ and $A_{10}$ independently of one another are $C_1$-$C_4$alkyl, the radicals $A_{11}$ independently of one another are hydrogen or $C_1$-$C_4$alkyl, and $a_2$ is a number from 1 to 10;

$A_{12}$ is $C_2$-$C_6$alkylene, $A_{13}$ and $A_{14}$ independently of one another are hydrogen, $C_1$-$C_4$alkyl, cyclohexyl or a group of the formula (a-2), or the radicals $A_{13}$ and $A_{14}$, together with the nitrogen atom to which they are bonded, form a morpholino group, the radicals $A_{15}$ independently of one another are hydrogen or $C_1$-$C_4$alkyl, and $a_3$ is a number from 2 to 10, $R_1$ is $C_1$-$C_{11}$alkyl or $C_2$-$C_6$hydroxyalkyl, $R_2$ is $C_{10}$-$C_{20}$alkyl or a group of the formula (b-1);

$R_3$ is $C_2$-$C_6$alkylene, the radicals $R_4$ independently of one another are $C_1$-$C_4$alkyl or cyclohexyl;

$R_5$ and $R_6$ independently of one another are hydrogen, $C_1$-$C_4$alkyl, cyclohexyl or a group of the formula (b-2), or the radicals $R_5$ and $R_6$, together with the nitrogen atom to which they are bonded, form a morpholino group and $b_1$ is a number from 1 to 10;

$R_8$, $R_9$ and $R_{10}$ independently of one another are $C_2$-$C_6$alkylene and the radicals $R_7$ independently of one another are a group of the formula (b-3), $R_{11}$ and $R_{12}$ independently of one another are $C_1$-$C_4$alkyl, and the radicals $R_{13}$ independently of one another are $C_1$-$C_4$alkyl or cyclohexyl.

According to a preferred embodiment the compound of the formula (A-I) corresponds to the formula (A-I-1)

(A-I-1)

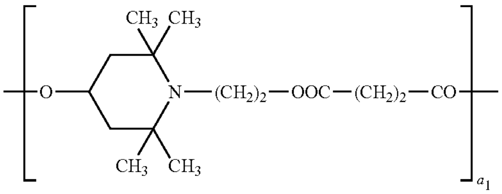

wherein $a_1$ is a number from 2 to 10, the compound of the formula (A-II) corresponds to the formula (A-II-1) or (A-II-2), (A-II-1)

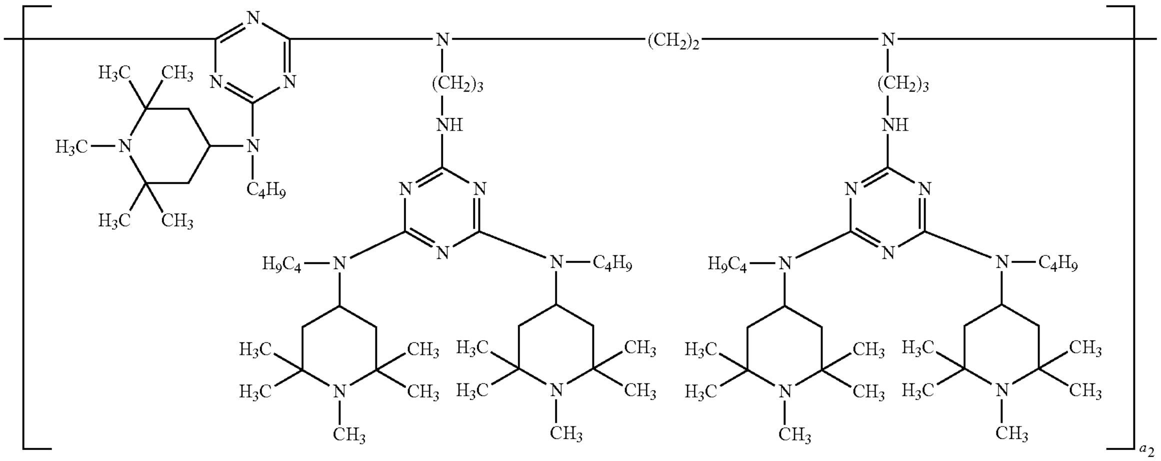

wherein $a_2$ is a number from 1 to 10, (A-II-2)
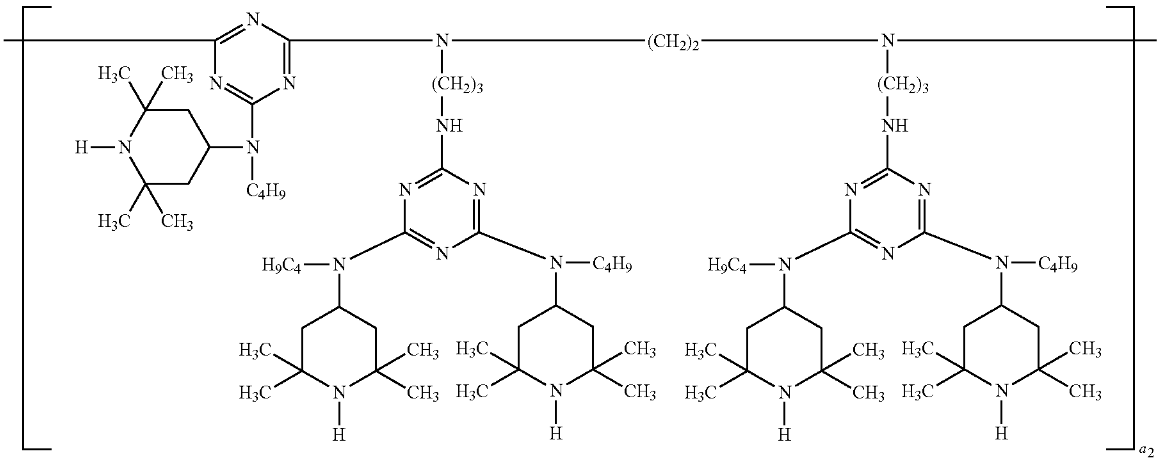
wherein $a_2$ is a number from 1 to 10,
the compound of the formula (A-III) corresponds to the formula (A-III-1), (A-III-2), (A-III-3) or (A-III-4),
(A-III-1)
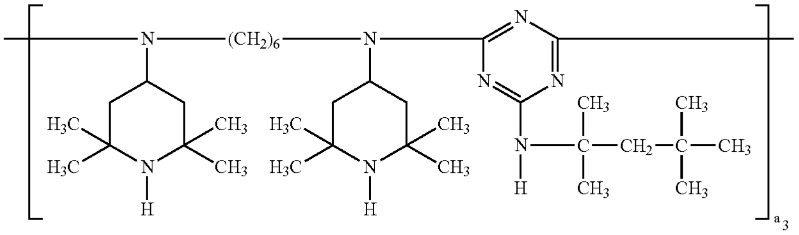
wherein $a_3$ is a number from 2 to 10,
(A-III-2)
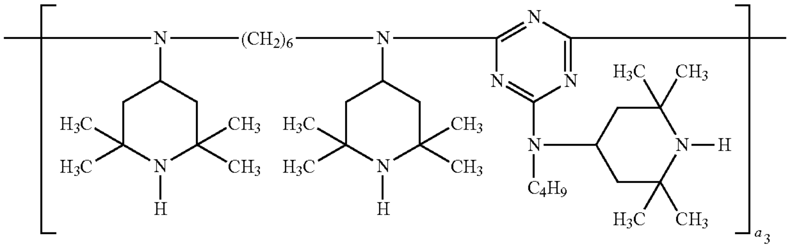
wherein $a_3$ is a number from 2 to 10, (A-III-3)

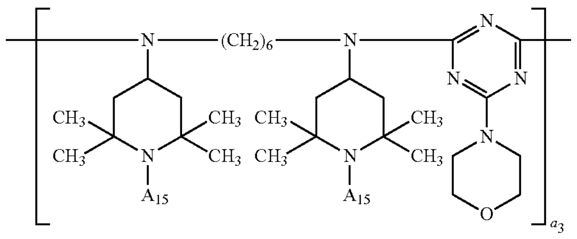

wherein $A_{15}$ is hydrogen or methyl and $a_3$ is a number from 2 to 10, (A-III-4)

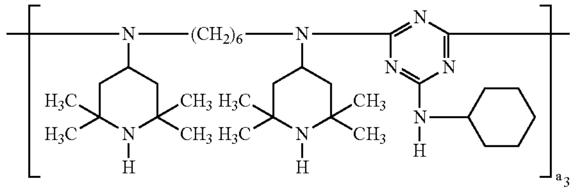

wherein $a_3$ is a number from 2 to 10.

the compound of the formula (B-I) corresponds to the formula (B-I-1), (B-I-2) or (B-I-3), the compound of the formula (B-III) corresponds to the formula (B-III-1), (B-III-1)

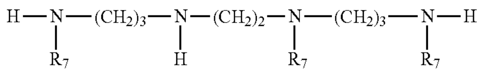

wherein $R_7$ is a group of the formula (b-3-1).

(b-3-1)

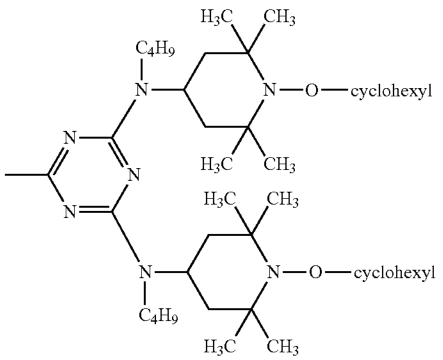

(B-I-1)

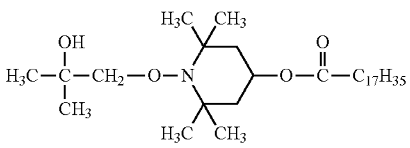

(B-I-2)

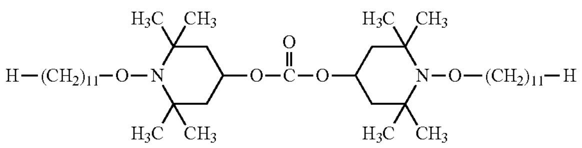

(B-I-3)

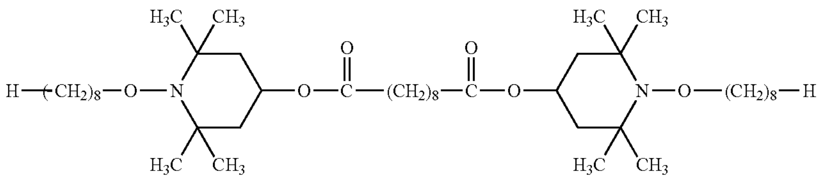

the compound of the formula (B-II) corresponds to the formula (B-II-1), (B-II-1)

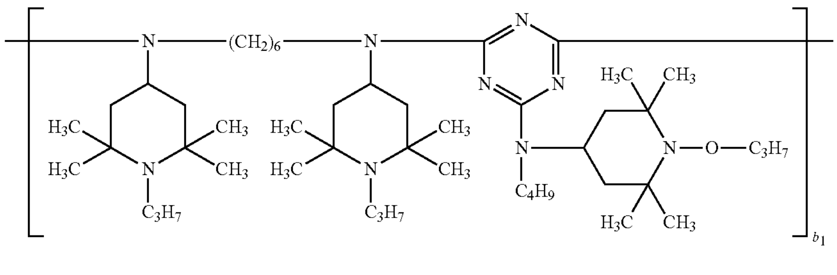

wherein $b_1$ is a number from 1 to 10,

According to a particular preferred embodiment component (A) is a compound of the formula (A-I-1) and component (B) is a compound of the formula (B-II-1), or component (A) is a compound of the formula (A-II-1-a) and component (B) is a compound of the formula (B-III-1), or component (A) is a compound of the formula (A-III-2) and component (B) is a compound of the formula (B-I-1), (A-I-1)

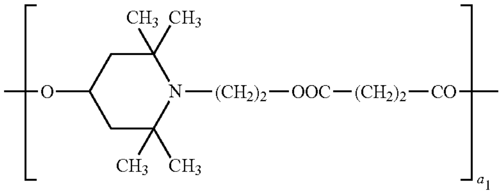

wherein $a_1$ is a number from 2 to 10, and

Y is the group

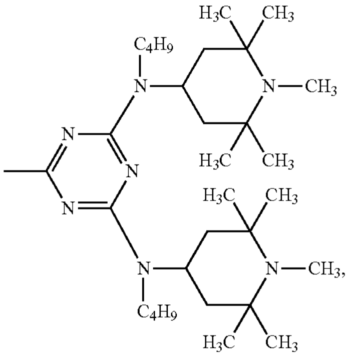

wherein $a_3$ is a number from 2 to 10, (A-II-1-a)

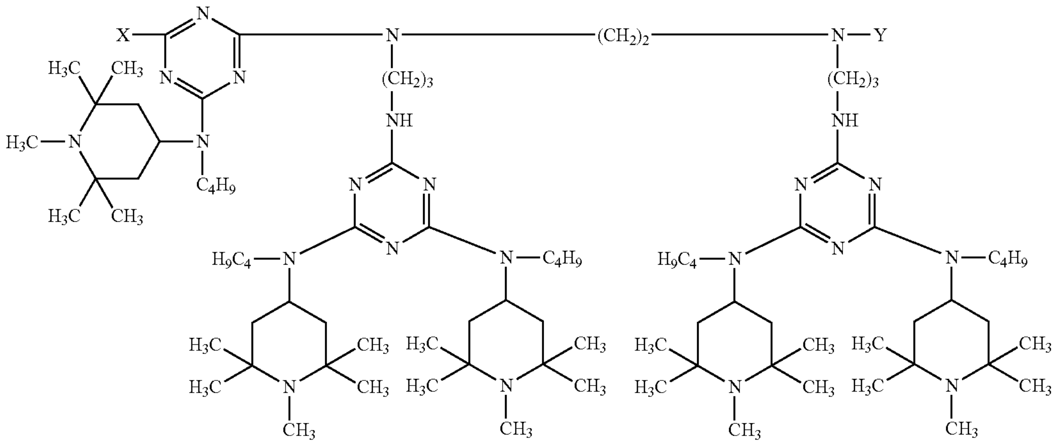

wherein X is the group

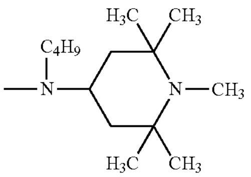

(B-I-1)

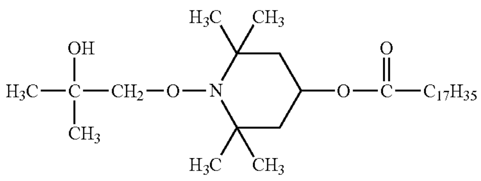

-continued (B-II-1)

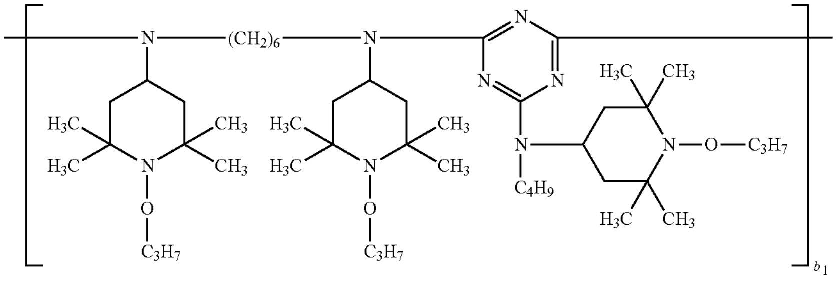

wherein $b_1$ is a number from 1 to 10, (B-III-1)

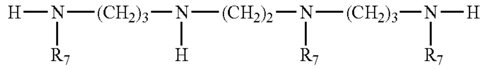

wherein $R_7$ is a group of the formula (b-3-1).

(b-3-1)

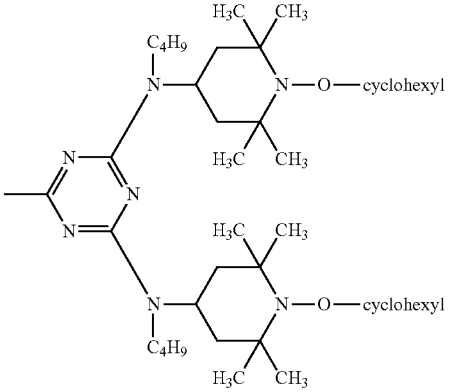

The polyolefin may additionally contain one or more conventional additives. Suitable examples are listed below.

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1-methyltridec-1-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-didodecylthiomethyl-4-nonyl phenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl) adipate.

1.4. Tocopherols, for example α-tocopherol, β-tocopherol, γ-tocopherol, δ-tocopherol and mixtures thereof (vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl) disulfide.

1.6. Alkylidenebisphenols, for example 2,2'-methylenebis (6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methyl phenyl)butane, 2,6-bis(3-tert-butyl-5-methyl-2-hydroxybenzyl)-4-methyl phenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyhbutyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis(3,5-di-tert-butyl-4-hydroxyphenyl)propane, 2,2-bis(5-tert-butyl-4-hydroxy2-methylphenyl)-4-n-dodecylmercaptobutane, 1,1,5,5-tetra-(5-tert-butyl-4-hydroxy-2-methylphenyl)pentane.

1.7. O-, N- and S-benzyl compounds, for example 3,5,3',5'-tetra-tert-butyl-4,4'-dihydroxydibenzyl ether, octadecyl-4-hydroxy-3,5-dimethylbenzyl mercaptoacetate, tridecyl-4-hydroxy-3,5-d i-tert-butyl benzylmercaptoacetate, tris(3,5-di-tert-butyl-4-hydroxybenzyl)amine, bis(4-tert-butyl-3-hydroxy-2,6-dimethylbenzyl)dithioterephthelate, bis(3,5-d i-tert-butyl-4-hydroxybenzyl)sulfide, isooctyl-3,5-d i-tert-butyl-4-hydroxybenzylmercaptoacetate.

1.8. Hydroxybenzylated malonates, for example dioctadecyl-2,2-bis(3,5-di-tert-butyl-2-hydroxybenzyl)malonate, di-octadecyl-2-(3-tert-butyl-4-hydroxy-5-methylbenzyl)malonate, di-dodecylmercaptoethyl-2,2-bis (3,5-di-tert-butyl-4-hydroxybenzyl)malonate, bis[4-(1,1,3,3-tetramethylbutyl) phenyl]-2,2-bis(3,5-di-tert-butyl-4-hydroxybenzyl) malonate.

1.9. Aromatic hydroxybenzyl compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, di-octadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-ditert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo [2.2.2]octane.

1.14. Esters of β-(5-tert-butyl-4-hydroxy-3-methylphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane; 3,9-bis[2-{3-(3-tert-butyl-4-hydroxy-5-methylphenyl)propionyloxy}-1,1-dimethylethyl]-2,4,8,10-tetraoxaspiro[5.5]undecane.

1.15. Esters of β-(3,5-dicyclohexyl-4-hydroxyphenyl) propionic acid with mono- or poly-hydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis (hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl) propionic acid e.g. N,N'-bis(3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl] propionyloxy)ethyl]oxamide (Naugard® XL-1, supplied by Uniroyal).

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino] ethane, 1,2-bis(phenylamino)propane, (o-tolyl)biguanide, bis[4-(1,3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octyl-phenothiazines, a mixture of mono- and dialkylated tert-octyl-phenothiazines, N-allylphenothiazine, N,N,N',N'-tetraphenyl-1,4-diaminobut-2-ene.

2. UV Absorbers and Light Stabilizers 2.1. 2-(2'-Hydroxyphenyl)benzotriazoles, for example 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis-(α,α-dimethylbenzyl)-2'-hydroxyphenyl)benzotriazole, 2-(3'-tert-butyl-2'-hydroxy-5'-(2-octyloxycarbonylethyl) phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-methoxycarbonylethyl) phenyl)benzotriazole, 2-(3'-tert-butyl-2'-hydroxy-5'-(2-octyloxycarbonylethyl)phenyl)benzotriazole, 2-(3'-tert-butyl- 5'-[2-(2-ethylhexyloxy)carbonylethyl]-2'-hydroxyphenyl) benzotriazole, 2-(3'-dodecyl-2'-hydroxy-5'-methylphenyl) benzotriazole, 2-(3'-tert-butyl-2'-hydroxy-5'-(2-isooctyloxycarbonylethyl)phenylbenzotriazole, 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxy-phenyl]-2H-benzotriazole with polyethylene glycol 300;

$$[R-CH_2CH_2-COO-CH_2CH_2 ]_2 ,$$

where R=3'-tert-butyl-4'-hydroxy-5'-2H-benzotriazol-2-yl-phenyl, 2-[2'-hydroxy-3'-(α,α-dimethylbenzyl)-5'-(1,1,3,3-tetramethylbutyl)-phenyl]benzotriazole; 2-[2'-hydroxy-3'-(1,1,3,3-tetramethylbutyl)-5'-(α,α-dimethylbenzyl)-phenyl] benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, for example 4-tert-butylphenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxycinnamate, butyl α-cyano-β-methyl-p-methoxycinnamate, methyl α-carbomethoxy-p-methoxycinnamate, N-(β-carbomethoxy-β-cyanovinyl)-2-methylindoline, neopentyl tetra(α-cyano-β,β-diphenylacrylate.

2.5. Nickel compounds, for example nickel complexes of 2,2'-thio-bis[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenylundecylketoxime, nickel complexes of 1-phenyl-4-lauroyl-5-hydroxypyrazole, with or without additional ligands.

2.6. Sterically hindered amines, for example carbonic acid bis(1-undecyloxy-2,2,6,6-tetramethyl-4-piperidyl)ester, bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl) nitrilotriacetate, tetrakis(2,2,6,6-tetramethyl-4-piperidyl)-1,2,3,4-butanetetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)-malonate, 3-n-octyl-7,7,9,9-tetramethyl-1,3,8-triazaspiro[4.5]decane-2,4-dione, bis(1-octyloxy-2,2,6,6-tetramethylpiperidyl)sebacate, bis(1-octyloxy-2,2,6,6-tetramethylpiperidyl)succinate, linear or cyclic condensates of N,N'-bis(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl) pyrrolidine-2,5-dione, a mixture of 4-hexadecyloxy- and 4-stearyloxy-2,2,6,6-tetramethylpiperidine, a condensate of N,N'-bis(2,2,6,6-tetramethyl-4-piperidyl)hexamethylenediamine and 4-cyclohexylamino-2,6-dichloro-1,3,5-triazine, a condensate of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); a condensate of 1,6-hexanediamine and 2,4,6-trichloro-1,3,5-triazine as well as N,N-dibutylamine and 4-butylamino-2,2,6,6-tetramethylpiperidine (CAS Reg. No. [192268-64-7]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxo-spiro[4,5]decane, a reaction product of 7,7,9,9-tetramethyl-2-cycloundecyl-1-oxa-3,8-diaza-4-oxospiro-[4,5]decane and epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl)hexamethylenediamine, a diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, a reaction product of maleic acid anhydride-α-olefin copolymer with 2,2,6,6-tetramethyl-4-aminopiperidine or 1,2,2,6,6-pentamethyl-4-aminopiperidine, 2,4-bis[N-(1-cyclohexyloxy-2,2,6,6-tetramethylpiperidine-4-yl)-N-butylamino]-6-(2-hydroxyethyl)amino-1,3,5-triazine, 1-(2-hydroxy-2-methylpropoxy)-4-octadecanoyloxy-2,2,6,6-tetramethylpiperidine, 5-(2-ethylhexanoyl)oxymethyl-3,3,5-trimethyl-2-morpholinone, Sanduvor (Clariant; CAS Reg. No. 106917-31-1], 5-(2-ethylhexanoyl)oxymethyl-3,3,5-trimethyl-2-morpholinone, the reaction product of 2,4-bis[(1-cyclohexyloxy-2,2,6,6-piperidine-4-yl)butylamino]-6-chloro-s-triazine with N,N'-bis(3-aminopropyl) ethylenediamine), 1,3,5-tris(N-cyclohexyl-N-(2,2,6,6-tetramethylpiperazine-3-one-4-yl)amino)-s-triazine, 1,3,5-tris(N-cyclohexyl-N-(1,2,2,6,6-pentamethylpiperazine-3-one-4-yl)amino)-s-triazine.

2.7. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-di methyl phenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy) phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethyl phenyl)-1,3,5-triazine, 2,4-bis(4-[2-ethylhexyloxy]-2-hydroxyphenyl)-6-(4-methoxyphenyl)-1,3,5-triazine, 2-(4,6-bis-biphenyl-4-yl-1,3,5-triazin-2-yl)-5-(2-ethyl-(n)-hexyloxy)phenol.

3. Metal deactivators, for example N,N'-diphenyloxamide, N-salicylal-N'-salicyloyl hydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.

4. Phosphites and phosphonites, for example triphenyl phosphite, diphenylalkyl phosphites, phenyldialkyl phosphites, tris(nonylphenyl) phosphite, trilauryl phosphite, trioctadecyl phosphite, distearylpentaerythritol diphosphite, tris(2,4-di-tert-butylphenyl) phosphite, diisodecyl pentaerythritol diphosphite, bis(2,4-di-tert-butylphenyl)pentaerythritol diphosphite, bis(2,4-di-cumylphenyl)pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, bis(2,4-di-tert-butyl-6-methylphenyl) methyl phosphite, bis(2,4-di-tert-butyl-6-methylphenyl) ethyl phosphite, 6-fluoro-2,4,8,10-tetra-tert-butyl-12-methyl-dibenz[d,g]-1,3,2-dioxaphosphocin, 2,2',2''-nitrilo [triethyltris(3,3',5,5'-tetra-tert-butyl-1,1'-biphenyl-2,2'-diyl) phosphite], 2-ethylhexyl(3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane.

The following phosphites are especially preferred:

Tris(2,4-di-tert-butylphenyl) phosphite (Irgafos® 168, Ciba Specialty Chemicals Inc.), tris(nonylphenyl) phosphite, (A)

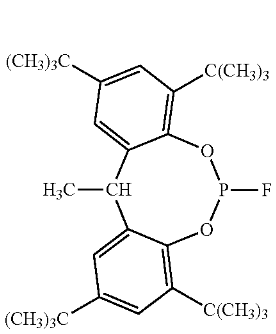

-continued (B)

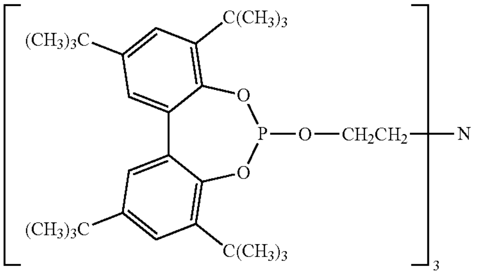

(C)

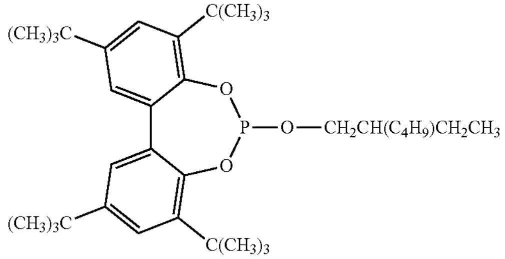

(D)

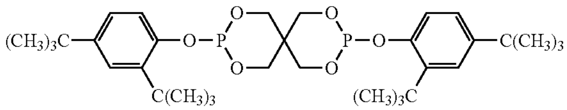

(E)

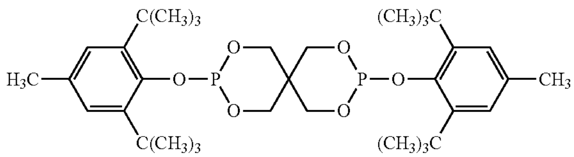

(F)

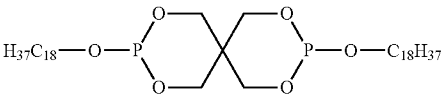

(G)

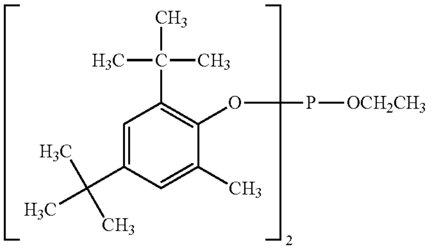

5. Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

6. Nitrones, for example, N-benzyl-alpha-phenylnitrone, N-ethyl-alpha-methylnitrone, N-octyl-alpha-heptylnitrone, N-lauryl-alpha-undecylnitrone, N-tetradecyl-alpha-tridecylnitrone, N-hexadecyl-alpha-pentadecylnitrone, N-octadecyl-alpha-heptadecylnitrone, N-hexadecyl-alpha-heptadecylnitrone, N-ocatadecyl-alpha-pentadecylnitrone, N-heptadecyl-alpha-heptadecylnitrone, N-octadecyl-alpha-hexadecylnitrone, nitrone derived from N,N-dialkylhydroxylamine derived from hydrogenated tallow amine.

7. Thiosynergists, for example dilauryl thiodipropionate, dimistryl thiodipropionate, distearyl thiodipropionate, pentaerythritol tetrakis[3-(dodecylthio)propionate] or distearyl disulfide.

8. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

9. Polyamide stabilizers, for example copper salts in combination with iodides and/or phosphorus compounds and salts of divalent manganese.

10. Basic co-stabilizers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example calcium stearate, zinc stearate, magnesium behenate, magnesium stearate, sodium ricinoleate and potassium palmitate, antimony pyrocatecholate or zinc pyrocatecholate.

11. Nucleating agents, for example inorganic substances, such as talcum, metal oxides, such as titanium dioxide or magnesium oxide, phosphates, carbonates or sulfates of, preferably, alkaline earth metals; organic compounds, such as mono- or polycarboxylic acids and the salts thereof, e.g. 4-tert-butylbenzoic acid, adipic acid, diphenylacetic acid, sodium succinate or sodium benzoate; polymeric compounds, such as ionic copolymers (ionomers). Especially preferred are 1,3:2,4-bis(3',4'-dimethylbenzylidene)sorbitol, 1,3:2,4-di(paramethyldibenzylidene)sorbitol, and 1,3:2,4-di (benzylidene)sorbitol.

12. Fillers and reinforcing agents, for example calcium carbonate, silicates, glass fibres, glass beads, asbestos, talc, kaolin, mica, barium sulfate, metal oxides and hydroxides, carbon black, graphite, wood flour and flours or fibers of other natural products, synthetic fibers.

13. Other additives, for example plasticisers, lubricants, emulsifiers, pigments, rheology additives, catalysts, flow-control agents, optical brighteners, flameproofing agents, antistatic agents and blowing agents.

14. Benzofuranones and indolinones, for example those disclosed in U.S. Pat. Nos. 4,325,863; 4,338,244; 5,175,312; 5,216,052; 5,252,643; DE-A-4316611; DE-A-4316622; DE-A-4316876; EP-A-0589839, EP-A-0591102; EP-A-1291384 or 3-[4-(2-acetoxyethoxy)phenyl]-5,7-di-tert-butylbenzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butylbenzofuran-2-one, 3-(3,5-dimethyl-4-pivaloyloxyphenyl)-5,7-di-tert-butylbenzofuran-2-one, 3-(3,4-dimethylphenyl)-5,7-di-tert-butylbenzofuran-2-one, 3-(2,3-dimethylphenyl)-5,7-di-tert-butylbenzofuran-2-one, 3-(2-acetyl-5-isooctylphenyl)-5-isooctylbenzofuran-2-one.

The weight ratio of component (A) to the conventional additive is for example 1:100 to 100:1, preferably 1:100 to 10:1, in particular 1:10 to 10:1.

According to a preferred embodiment the polyolefin additionally contains as component (C) a phenolic antioxidant, preferably octadecyl 3-(3,5-di-tert-butyl-4-hydroxyphenyl) propionate.

Component (C) may be present in a concentration of for example 0.01 to 10%, relative to the weight of the polyolefin.

According to another preferred embodiment component (A) is a compound of the formula (A-I-1) and a compound of the formula (A-III-2), and component (B) is a compound of the formula (B-I-1) or (B-II-1), and the polyolefin optionally comprises octadecyl 3-(3,5-di-tert-butyl-4-hydroxyphenyl)propionate.

A further embodiment of the present invention is a polyolefin film, tape or monofilament made in accordance with the process described above.

Another embodiment of the present invention is the use of component (B) as light stabilizer to reduce the water carry-over of a light stabilized polyolefin film, tape or monofilament which contains component (A) as light stabilizer and which is passed through a water bath during production.

Still another embodiment of the present invention is a process for preparing a light stabilized polyolefin film, tape or monofilament, comprising the step of passing said light stabilized polyolefin film, tape or monofilament through a water bath at a haul off speed of 5 to 100 m/min, preferably 4 to 80 m/min or 10 to 50 m/min, in particular 20 to 40 m/min, characterized in that said polyolefin, film, tape or monofilament contains components (A) and (B) as defined above. All preferences described above also relate to this process which is useful for reducing the water carry-over from the water bath.

The examples below illustrate the invention in greater detail. All percentages and parts are by weight, unless stated otherwise.

Light Stabilizers Used in the Following Examples:

Compound (A-I-1):

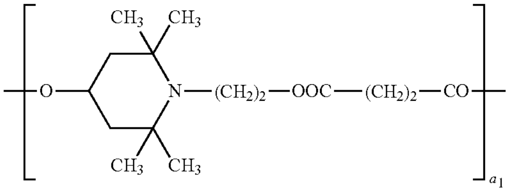

(Tinuvin®622)

wherein $a_1$ is a number from 2 to 10.

Compound (A-II-1-a):
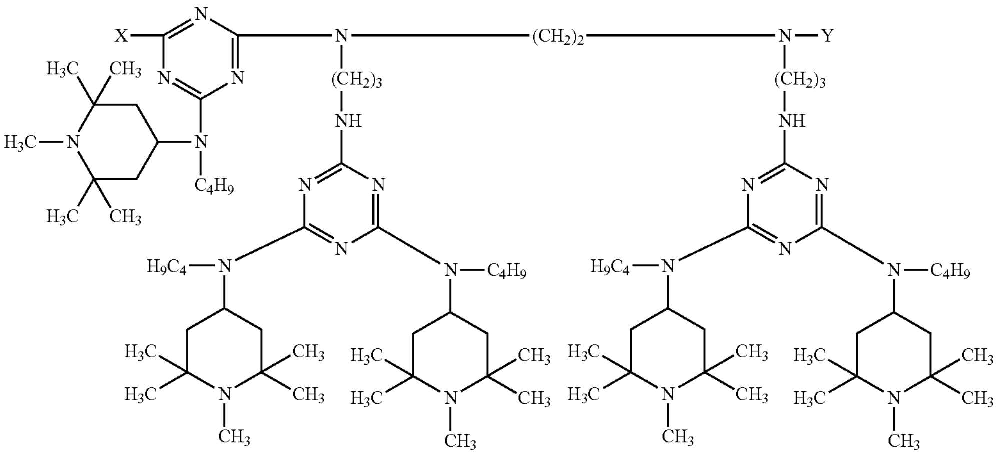
(Sabostab® UV 119)
wherein X is the group
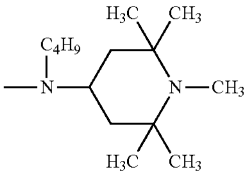
and
Y is the group
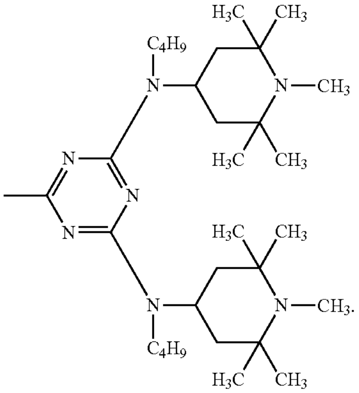
Compound (A-III-2):
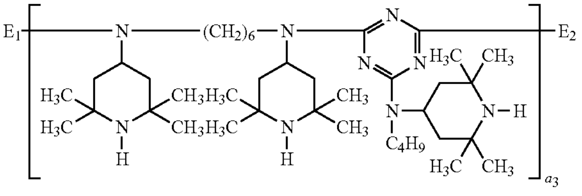
(Chimassorb®2020)
wherein $E_1$ is
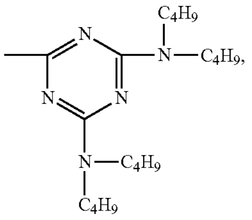
$E_2$ is
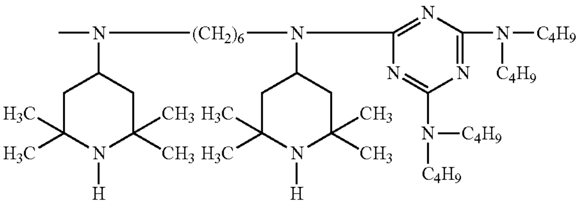
and $a_3$ is a number from 2 to 10.
Compound (B-I-1):
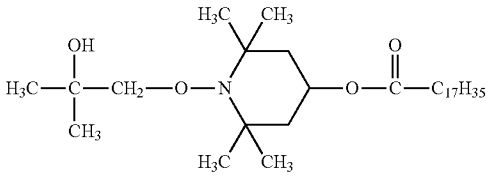

Compound (B-II-1):

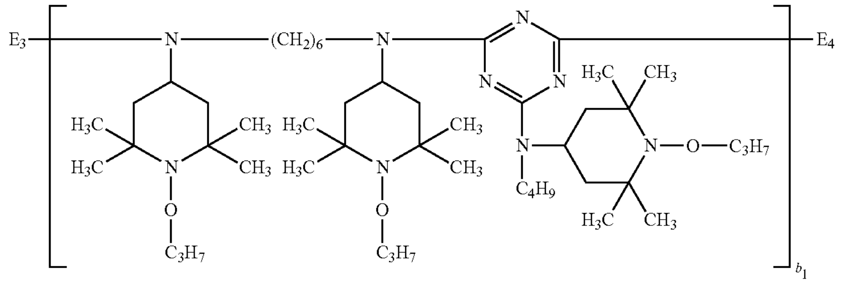

wherein $E_3$ is

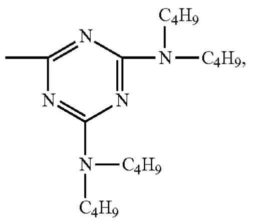

$E_4$ is

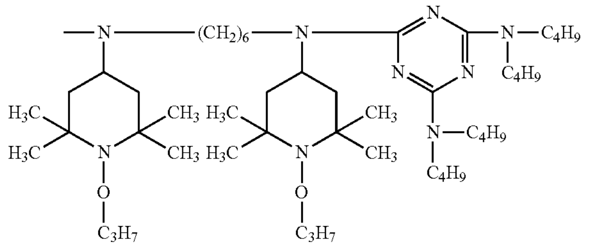

and wherein $b_1$ is a number from 2 to 10.

Compound (B-III-1):

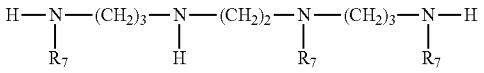

(Flamestab®NOR 116)

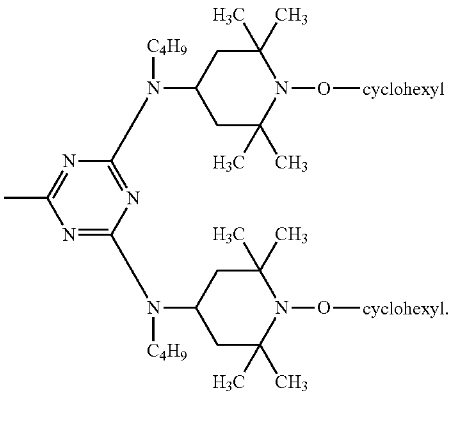

wherein $R_7$ is a group of the formula

Determination of Synergism for the Experiments Indicated Below:

The synergistic WCO (water carry-over) effect of two light stabilizers (α) and (β) is determined by a comparison of the expected values of the WCO with the actually measured values of the WCO activity. The expected values are calculated on the basis of the additivity law (B. Ranby and J. F. Rabek; Photodegradation, Photo-oxidation and Photostabilization of Polymers, Principles and Applications, John Wiley & Sons, London, New York, Sydney, Toronto, 1975, pages 418 and 419) according to the following equation for a 1:1 ratio of the two light stabilizers:

$$\text{Expected } WCO \text{ activity} = \frac{WCO \text{ activity of } 100\% \ (\alpha) + WCO \text{ activity of } 100\% \ (\beta)}{3}$$

There is a synergistic WCO effect of the two light stabilizers in the samples below, when the "measured WCO"<the "calculated WCO" (Low WCO values are desied).

The above equation is adapted in appropriate manner, when the ratio of the two light stabilizers is different from 1:1; for example if the ratio is 2:1, the expected WCO effect can be calculated according to the following equation:

$$\text{Expected } WCO \text{ activity} = \frac{2 \times [WCO \text{ activity of } 100\% \ (\alpha)] + 1 \times [WCO \text{ activity of } 100\% \ (\beta)]}{3}$$

EXAMPLE 1

The light stabilizers indicated in Tables 1a and 1b are mixed in a high speed mixer (MTI, Mischtechnik International, Germany) to polyethylene (Dowlex® SC 2108). The mixture is extruded at 200° C. in a double screw extruder (Krauss Maffei Berstorff, Germany) to give granules which are subsequently converted in a semi industrial tape line (Leonard, Italy) to tapes at 220° C. Water carry-over is expressed in length (mm) to which water from the water cooling bath is carried along with the extrudate (200 micron) before entering the drawing part. The lower the water carry-over, the faster and more economically a film, drawn tape or monofilament can be processed. The results are shown in Tables 1a and 1b.

TABLE 1a

| Light stabilizer | Haul off speed (m/min) 30 | 35 | 40 |
|---|---|---|---|
| | Water carry-over in mm *) | | |
| 0.8% of Compound (A-I-1) | 120 | 130 | 140 |
| 0.8% of Compound (B-II-1) | 20 | 40 | 50 |
| 0.7% of Compound (A-I-1) plus 0.1% of Compound (B-II-1) | 80 | 100 | 120 |
| | Calculated: 108 | Calculated: 119 | Calculated: 129 |

*) Low values are desired.

TABLE 1b

| Light stabilizer | Haul off speed (m/min) 30 | 35 | 40 |
|---|---|---|---|
| | Water carry-over in mm *) | | |
| 0.8% of Compound (A-II-1-a) | 380 | 450 | 450 |
| 0.8% of Compound (B-III-1) | 30 | 50 | 60 |
| 0.5% of Compound (A-II-1-a) plus 0.3% of Compound (B-III-1) | 70 | 120 | 130 |
| | Calculated: 249 | Calculated: 300 | Calculated: 304 |

*) Low values are desired.

EXAMPLE 2

The light stabilizers indicated in Tables 2a and 2b are mixed in a high speed mixer (MTI, Mischtechnik International, Germany) to polyethylene (Dowlex® SC 2108) which contains 0.5% by weight, relative to the weight of the polyethylene, of Compound (A-I-1). The mixture is extruded at 200° C. in a double screw extruder (Krauss Maffei Berstorff, Germany) to give granules which are subsequently converted in a semi industrial tape line (Leonard, Italy) to tapes at 220° C. Water carry-over is expressed in length (mm) to which water from the water cooling bath is carried along with the extrudate (200 micron) before entering the drawing part. The lower the water carry-over, the faster and more economically a film, drawn tape or monofilament can be processed. The results are shown in Tables 2a and 2b.

TABLE 2a

| Light stabilizer | Water carry-over in mm *) at a haul off speed of 27 m/min |
|---|---|
| 0.3% of Compound (A-III-2) | 350 |
| 0.3% of Compound (B-II-1) | 60 |
| 0.2% of Compound (A-III-2) plus 0.1% of Compound (B-II-1) | 180 |
| | Calculated: 253 |

*) Low values are desired.

TABLE 2b

| Light stabilizer | Water carry-over in mm *) at a haul off speed of 27 m/min |
|---|---|
| 0.3% of Compound (A-III-2) | 350 |
| 0.3% of Compound (B-I-1) | 70 |

TABLE 2b-continued

| Light stabilizer | Water carry-over in mm *) at a haul off speed of 27 m/min |
|---|---|
| 0.25% of Compound (A-III-2) plus 0.05% of Compound (B-I-1) | 70 |
| | Calculated: 303 |

*) Low values are desired.

EXAMPLE 3

The light stabilizers indicated in Tables 3a and 3b are mixed in a high speed mixer (MTI, Mischtechnik International, Germany) to polypropylene (Polychim® A 10 TB). The mixture is extruded at 230° C. in a double screw extruder (Krauss Maffei Berstorff, Germany) to give granules which are subsequently converted in a semi industrial tape line (Leonard, Italy) to tapes at 240° C. Water carry-over is expressed in length (mm) to which water from the water cooling bath is carried along with the extrudate (240 micron) before entering the drawing part. The lower the water carry-over, the faster and more economically a film, drawn tape or monofilament can be processed. The results are shown in Tables 3a and 3b.

TABLE 3a

| Light stabilizer | Water carry-over in mm *) at a haul off speed of 20 m/min |
|---|---|
| 0.6% of Compound (A-III-2) | >600 |
| 0.6% of Compound (B-I-1) | 130 |
| 0.3% of Compound (A-III-2) plus 0.3% of Compound (B-I-1) | 210 |
| | Calculated: >365 |

*) Low values are desired.

TABLE 3b

| Light stabilizer | Water carry-over in mm *) at a haul off speed of 20 m/min |
|---|---|
| 0.6% of Compound (A-III-2) | >600 |
| 0.6% of Compound (B-I-1) | 130 |
| 0.4% of Compound (A-III-2) plus 0.2% of Compound (B-I-1) | 350 |
| | Calculated: >443 |

*) Low values are desired.

EXAMPLE 4

The light stabilizers indicated in Table 4 are mixed in a high speed mixer (MTI, Mischtechnik International, Germany) to polyethylene (Dowlex® SC 2108) which contains 0.5% by weight, relative to the weight of the polyethylene, of Compound (A-I-1). The mixture is extruded at 200° C. in a double screw extruder (Krauss Maffei Berstorff, Germany) to give granules which are subsequently converted in a semi industrial tape line (Leonard, Italy) to tapes at 220° C. Water carry-over is expressed in length (mm) to which water from the water cooling bath is carried along with the extrudate (100 micron) before entering the drawing part. The lower the water carry-over, the faster and more economically a film, drawn tape or monofilament can be processed. The results are indicated in Table 4.

TABLE 4

| Light stabilizer | Water carry-over in mm *) at a haul off speed of 21 m/min |
|---|---|
| 0.3% of Compound (A-III-2) | 140 |
| 0.25% of Compound (A-III-2) plus 0.05% of Compound (B-II-1) plus 0.025% of octadecyl 3-(3,5-di-tert-butyl-4-hydroxyphenyl)propionate | 100 |

*) Low values are desired.

In the above examples "%" means "% by weight relative to the weight of the polyolefin".

The invention claimed is:

1. A process for reducing water carry-over of a light stabilized polyolefin film, tape or monofilament, the process comprising:

adding a light stabilizer (A) and a light stabilizer (B) to a polyolefin to obtain a mixture; and extruding the mixture while passing the mixture through a water bath to obtain the light stabilized polyolefin film, tape or monofilament, wherein water carry-over of the obtained light stabilized polyolefin film, tape or monofilament is lower than water carry-over of a light stabilized polyolefin film, tape or monofilament including the light stabilizer (A) and not including the light stabilizer (B), wherein the light stabilizer (A) is at least one compound selected from the group consisting of a compound of formula (A-I), a compound of (A-II) and a compound of formula (A-III), (A-I)

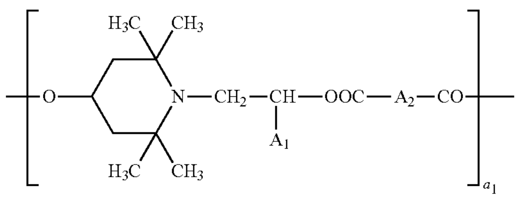

wherein $A_1$ is hydrogen or $C_1$-$C_4$alkyl, $A_2$ is a direct bond or $C_1$-$C_{10}$alkylene, and $a_1$ is a number from 2 to 20;

(A-II)

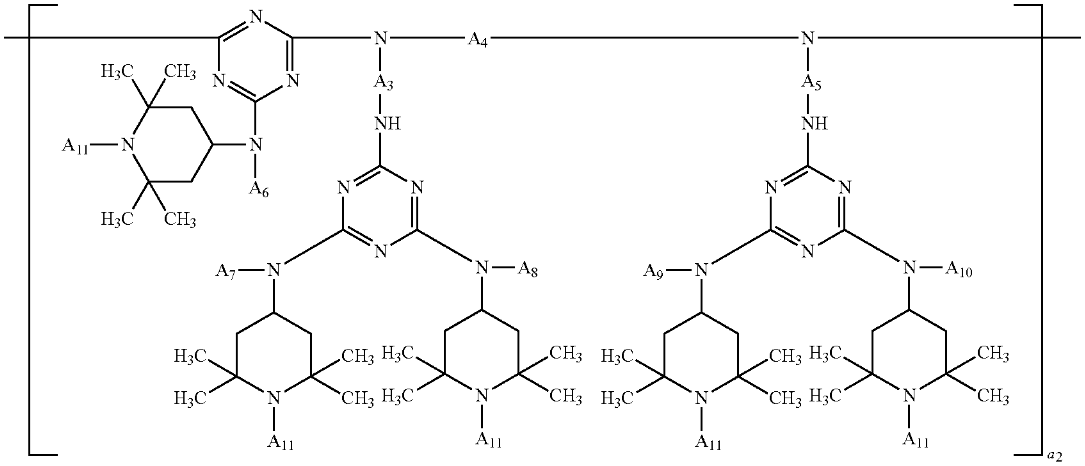

wherein $A_3$, $A_4$ and $A_5$ independently of one another are $C_2$-$C_{18}$alkylene, $A_6$, $A_7$, $A_8$, $A_9$ and $A_{10}$ independently of one another are hydrogen, $C_1$-$C_{12}$alkyl, $C_5$-$C_{12}$cycloalkyl or a group of formula (a-1), (a-1)

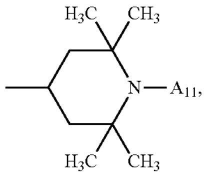

wherein $A_{11}$ independently of one another are hydrogen, $C_1$-$C_{12}$alkyl or $C_5$-$C_{12}$cycloalkyl, and $a_2$ is a number from 1 to 20;

(A-III)

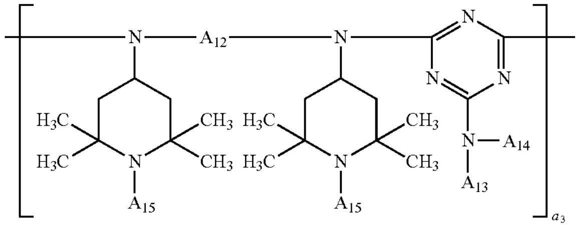

wherein $A_{12}$ is $C_2$-$C_{18}$alkylene, $C_5$-$C_7$cycloalkylene or $C_1$-$C_4$alkylenedi($C_5$-$C_7$cycloalkylene), $A_{13}$ and $A_{14}$ independently of one another are hydrogen, $C_1$-$C_{12}$alkyl, $C_5$-$C_{12}$cycloalkyl or a group of formula (a-2), (a-2)

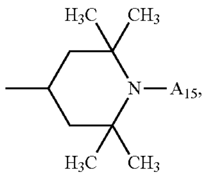

wherein $A_{15}$ independently of one another are hydrogen, $C_1$-$C_{12}$alkyl or $C_5$-$C_{12}$cycloalkyl or $A_{13}$ and $A_{14}$, together with the nitrogen atom to which they are bonded, form a 5- to 10-membered heterocyclic ring, and $a_3$ is a number from 2 to 20; and the light stabilizer (B) is at least one compound selected from the group consisting of a compound of formula (B-I), a compound of formula (B-II), a compound of formula (B-III) and a compound of formula (B-IV), (B-I)

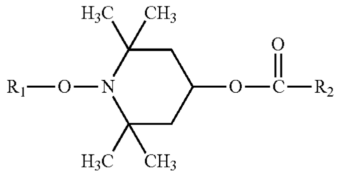

wherein $R_1$ is $C_1$-$C_{18}$alkyl, $C_1$-$C_{18}$hydroxyalkyl, cyclohexyl or hydroxycyclohexyl or $R_1$ is a group —$C(C_6H_5)(H)CH_2$—OH and $R_2$ is $C_1$-$C_{25}$alkyl;

(B-11)

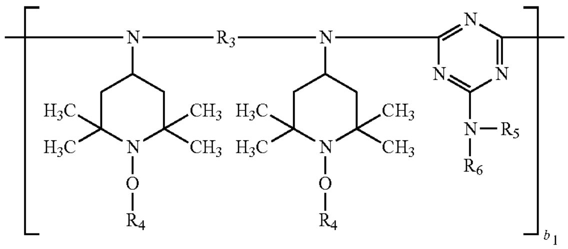

wherein $R_3$ is $C_2$-$C_{18}$alkylene, $C_5$-$C_7$cycloalkylene or $C_1$-$C_4$alkylenedi($C_5$-$C_7$cycloalkylene), $R_4$ independently of one another are $C_1$-$C_{12}$alkyl or $C_5$-$C_{12}$cycloalkyl, $R_5$ and $R_6$ independently of one another are hydrogen, $C_1$-$C_{12}$alkyl, $C_5$-$C_{12}$cycloalkyl or a group of formula (b-2), (b-2)

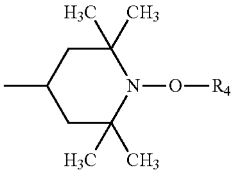

or $R_5$ and $R_6$, together with the nitrogen atom to which they are bonded, form a 5- to 10-membered heterocyclic ring and $b_1$ is a number from 1 to 20;

(B-III)

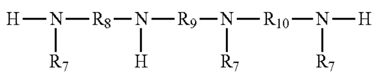

wherein $R_8$, $R_9$ and $R_{10}$ independently of one another are $C_2$-$C_{18}$alkylene and $R_7$ independently of one another are a group of formula (b-3)

(b-3)

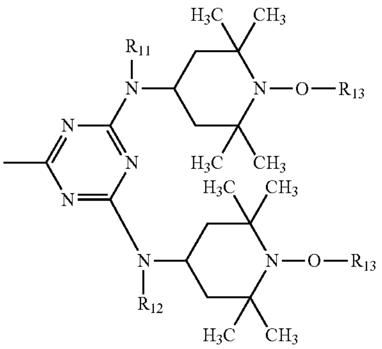

wherein $R_{11}$ and $R_{12}$ independently of one another are hydrogen, $C_1$-$C_{12}$alkyl, $C_5$-$C_{12}$cycloalkyl or a group of formula (b-4)

(b-4)

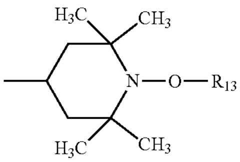

and $R_{13}$ independently of one another are $C_1$-$C_{12}$alkyl or $C_5$-$C_{12}$cycloalkyl;

(B-IV)

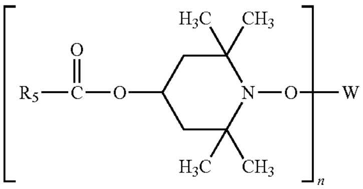

wherein $R_5$ is $C_1$-$C_{25}$alkyl, n is a number from 1 to 10, and

W is a wax residue comprising between 50 and 1000 carbon atoms.

2. The process according to claim 1, wherein $A_1$ is hydrogen, $A_2$ is $C_2$-$C_6$alkylene, $a_1$ is a number from 2 to 10, $A_3$, $A_4$ and $A_5$ independently of one another are $C_2$-$C_6$alkylene, $A_6$, $A_7$, $A_8$, $A_9$ and $A_{10}$ independently of one another are $C_1$-$C_4$alkyl, $A_{11}$ independently of one another are hydrogen or $C_1$-$C_4$alkyl, $a_2$ is a number from 1 to 10, $A_{12}$ is $C_2$-$C_6$alkylene, $A_{13}$ and $A_{14}$ independently of one another are hydrogen, $C_1$-$C_4$alkyl, cyclohexyl or a group of the formula (a-2), or $A_{13}$ and $A_{14}$, together with the nitrogen atom to which they are bonded, form a morpholino group, $A_{15}$ independently of one another are hydrogen or $C_1$-$C_4$alkyl, $a_3$ is a number from 2 to 10, $R_1$ is $C_1$-$C_{11}$alkyl or $C_2$-$C_6$hydroxyalkyl, $R_2$ is $C_{10}$-$C_{20}$alkyl or a group of the formula (b-1), $R_3$ is $C_2$-$C_6$alkylene, $R_4$ independently of one another are $C_1$-$C_4$alkyl or cyclohexyl, $R_5$ and $R_6$ independently of one another are hydrogen, $C_1$-$C_4$alkyl, cyclohexyl or a group of the formula (b-2), or $R_5$ and $R_6$, together with the nitrogen atom to which they are bonded, form a morpholino group, $b_1$ is a number from 1 to 10, $R_8$, $R_9$ and $R_{10}$ independently of one another are $C_2$-$C_6$alkylene, $R_7$ independently of one another are a group of the formula (b-3), $R_{11}$ and $R_{12}$ independently of one another are $C_1$-$C_4$alkyl, and $R_{13}$ independently of one another are $C_1$-$C_4$alkyl or cyclohexyl.

3. The process according to claim 1, wherein the compound of the formula (A-I) corresponds to a compound of formula (A-I-1)

(A-I-1)

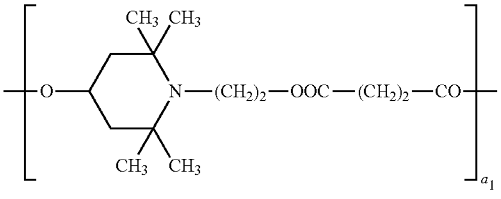

wherein $a_1$ is a number from 2 to 10, the compound of the formula (A-II) corresponds to a compound of formula (A-II-1) or (A-II-2), (A-II-1)
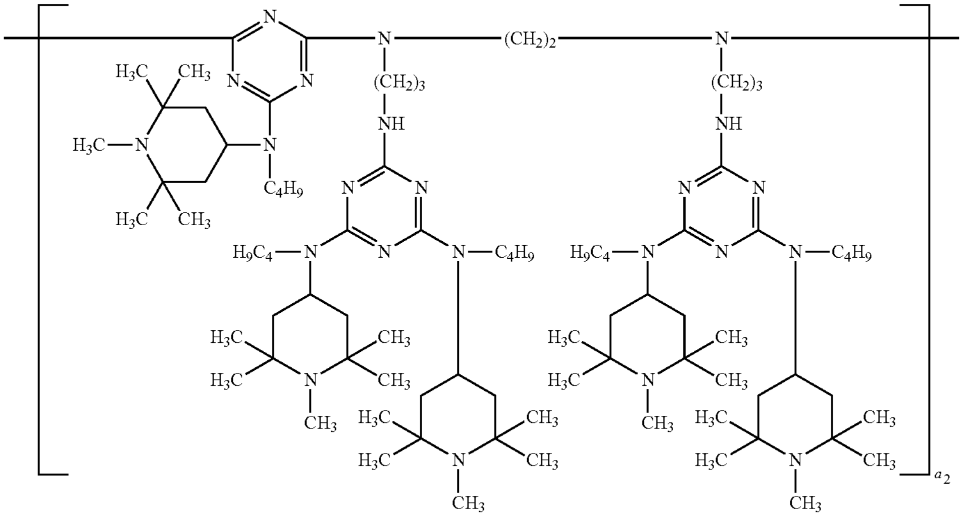
wherein $a_2$ is a number from 1 to 10,
(A-II-2)
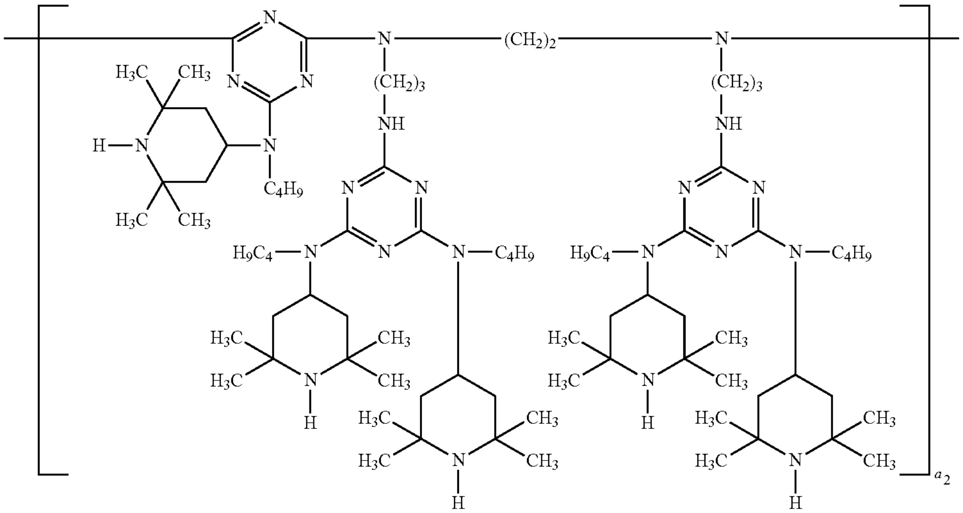
wherein $a_2$ is a number from 1 to 10,
the compound of the formula (A-III) corresponds to a compound of formula (A-III-1), (A-III-2), (A-III-3) or (A-III-4),
(A-III-1)
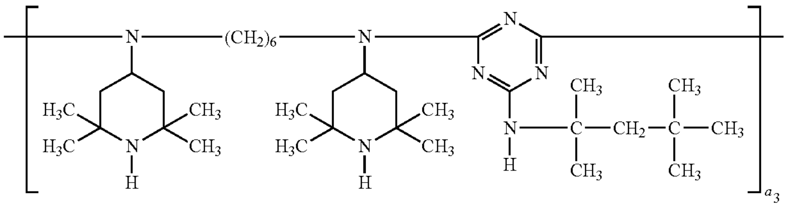
wherein $a_3$ is a number from 2 to 10, (A-III-2)

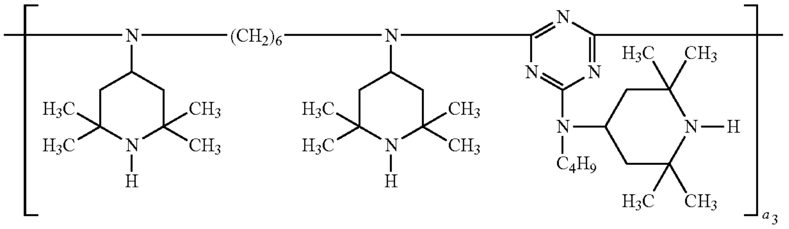

wherein $a_3$ is a number from 2 to 10, (A-III-3)

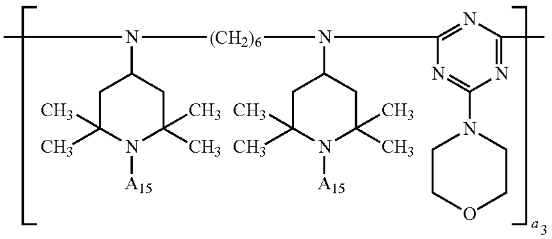

wherein $A_{15}$ is hydrogen or methyl and $a_3$ is a number from 2 to 10, (A-III-4)

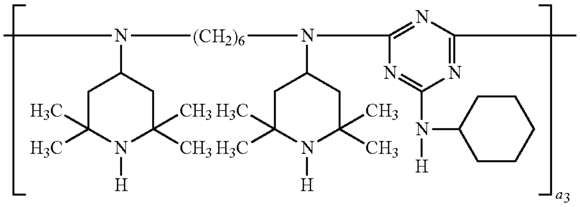

wherein $a_3$ is a number from 2 to 10;

the compound of the formula (B-I) corresponds to a compound of formula (B-I-1), (B-I-1)

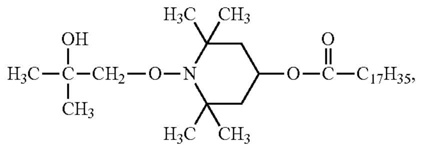

the compound of the formula (B-II) corresponds to a compound of formula (B-II-1), (B-II-1)

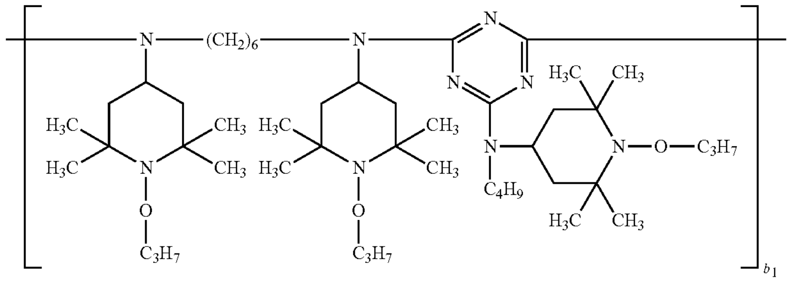

wherein $b_1$ is a number from 1 to 10, the compound of the formula (B-III) corresponds to a compound of formula (B-III-1), (B-III-1)

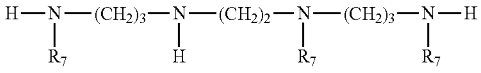

wherein $R_7$ is a group of formula (b-3-1)

(b-3-1)

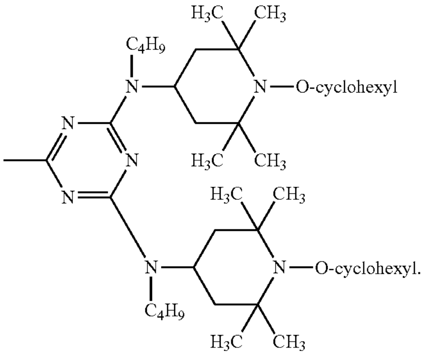

4. The process according to claim 1, wherein the polyolefin film, tape or monofilament additionally contains a phenolic antioxidant (C).

5. The process according to claim 1, wherein the light stabilizer (A) is a compound of formula (A-I-1) and the light stabilizer (B) is a compound of formula (B-II-1), or the light stabilizer (A) is a compound of formula (A-II-1-a) and the light stabilizer (B) is a compound of formula (B-III-1), or the light stabilizer (A) is a compound of formula (A-III-2) and the light stabilizer (B) is a compound of formula (B-I-1), (A-I-1)

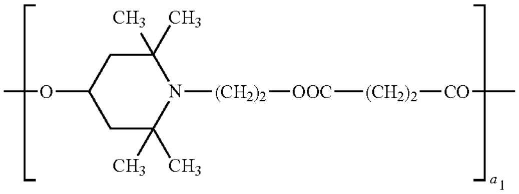

wherein $a_1$ is a number from 2 to 10, wherein X is

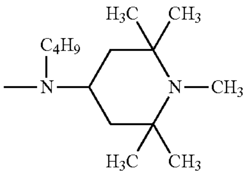

and

Y is

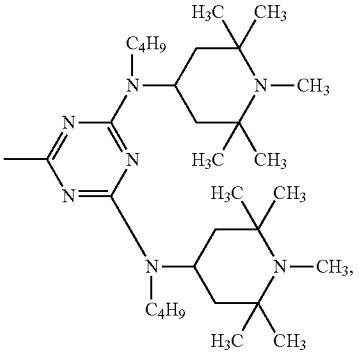

(A-III-2)

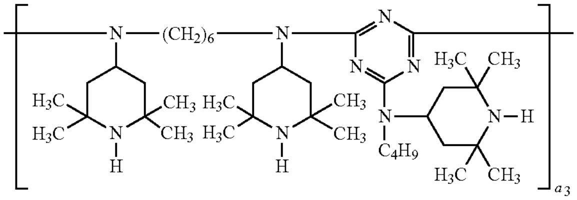

wherein $a_3$ is a number from 2 to 10, (A-II-1-a)

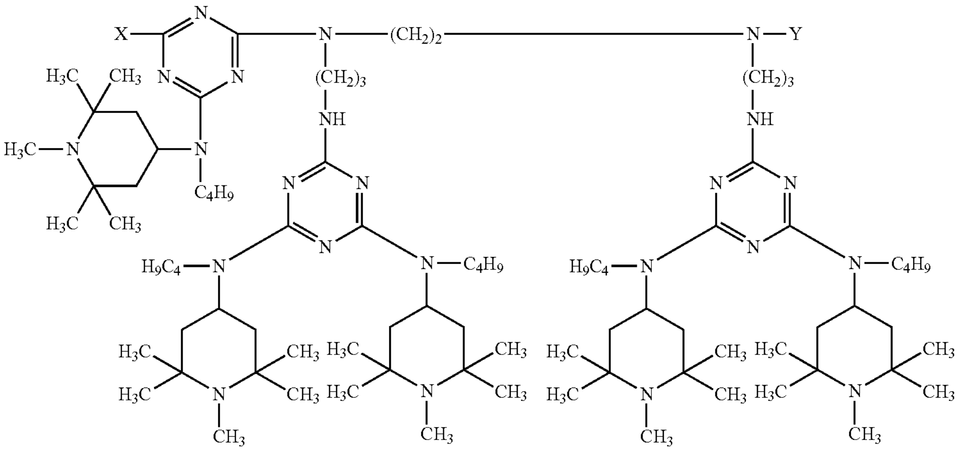

(B-I-1)

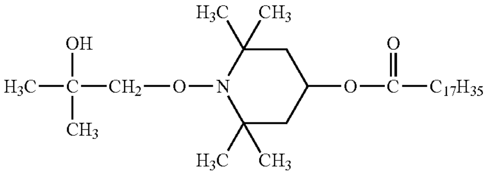

(B-II-1)

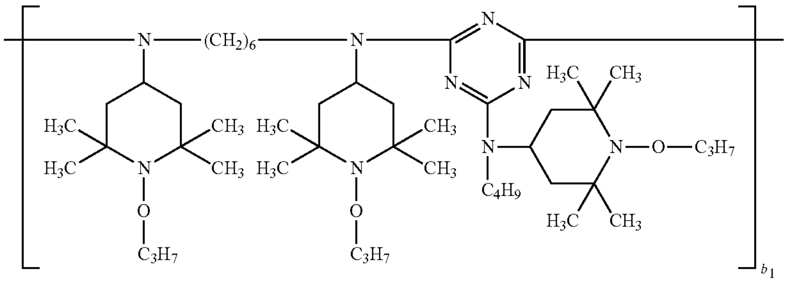

wherein $b_1$ is a number from 1 to 10, (B-III-1)

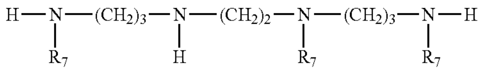

wherein $R_7$ is a group of formula (b-3-1)

(b-3-1)

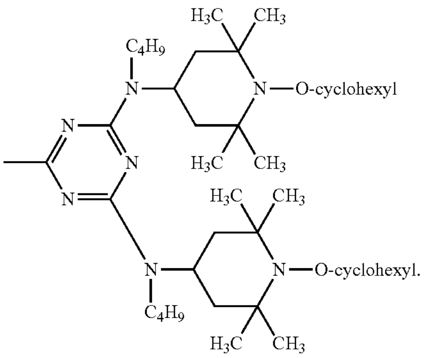

6. The process according to claim 5, wherein the light stabilizer (A) is the compound of formula (A-I-1) and the light stabilizer (B) is the compound of formula (B-II-1).

7. The process according to claim 5, wherein the light stabilizer (A) is the compound of formula (A-II-1-a) and the light stabilizer (B) is the compound of formula (B-III-1).

8. The process according to claim 5, wherein the light stabilizer (A) is the compound of formula (A-III-2) and the light stabilizer (B) is the compound of formula (B-I-1).

9. The process according to claim 1, wherein the light stabilizer (A) is a compound of formula (A-I-1) and a compound of formula (A-III-2), and the light stabilizer (B) is a compound of formula (B-I-1) or (B-II-1), and wherein the polyolefin film, tape or monofilament optionally comprises octadecyl 3-(3,5-di-tert-butyl-4-hydroxyphenyl)propionate, (A-I-1)

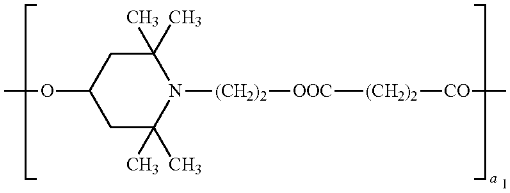

wherein $a_1$ is a number from 2 to 10, (A-III-2)

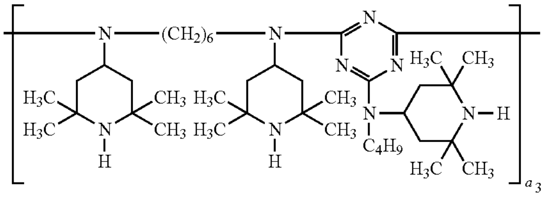

wherein $a_3$ is a number from 2 to 10, (B-I-1)

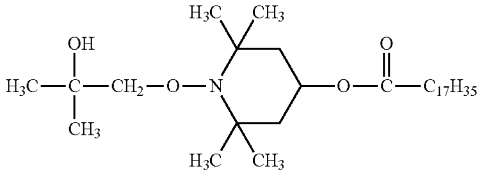

(B-II-1)

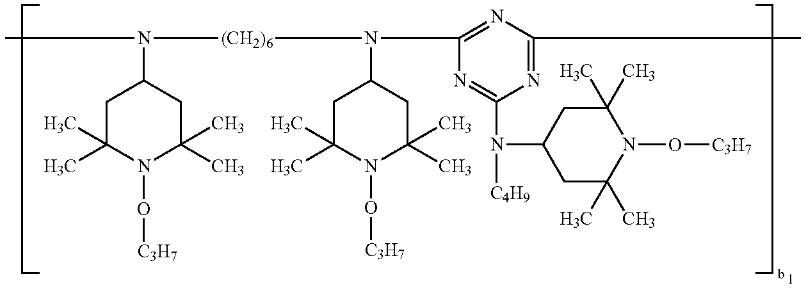

wherein $b_1$ is a number from 1 to 10.

10. The process according to claim 1, wherein a weight ratio of the light stabilizer (A) to the light stabilizer (B) is 1:20 to 20:1.

11. The process according to claim 1, wherein the polyolefin is a polyethylene or a polypropylene.

12. The process according to claim 1, wherein the light stabilized polyolefin film is a polyolefin multilayer film, and the light stabilizers (A) and (B) are in one layer in the polyolefin multilayer film.

13. A polyolefin film, tape or monofilament, obtained from the process of claim 1.

14. A process for preparing a light stabilized polyolefin film, tape or monofilament, the process comprising:

passing a polyolefin film, tape or monofilament through a water bath at a haul off speed of 5 to 100 m/min, wherein the polyolefin, film, tape or monofilament contains light stabilizers (A) and (B), the light stabilizer (A) is at least one compound selected from the group consisting of a compound of formula (A-I), a compound of formula (A-II) and a compound of formula (A-III), (A-1)

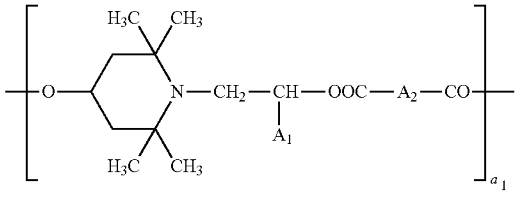

wherein $A_1$ is hydrogen or $C_1$-$C_4$alkyl, $A_2$ is a direct bond or $C_1$-$C_{10}$alkylene, and $a_1$ is a number from 2 to 20;

(A-II)

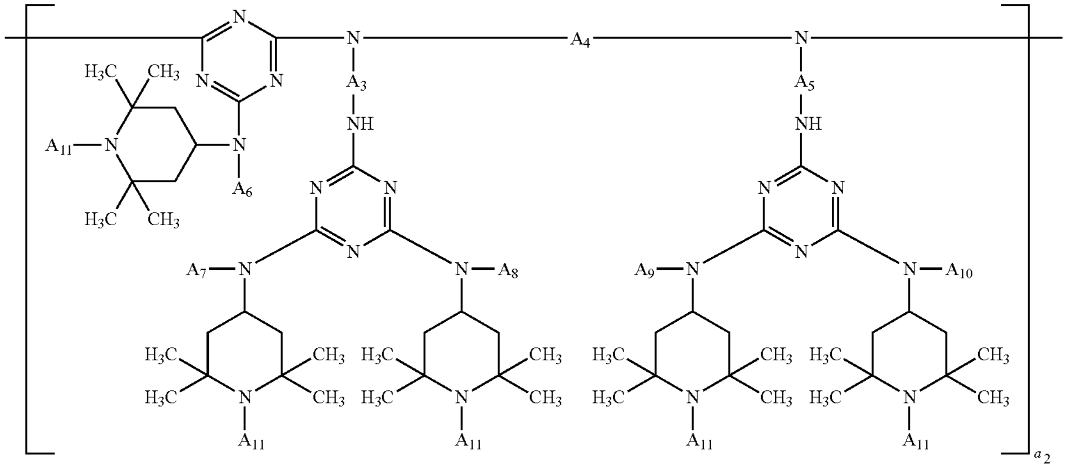

wherein $A_3$, $A_4$ and $A_5$ independently of one another are $C_2$-$C_{18}$alkylene, $A_6$, $A_7$, $A_8$, $A_9$ and $A_{10}$ independently of one another are hydrogen, $C_1$-$C_{12}$alkyl, $C_5$-$C_{12}$cycloalkyl or a group of formula (a-1), (a-1)

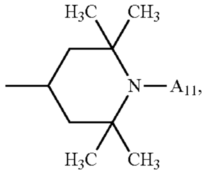

wherein $A_{11}$ independently of one another are hydrogen, $C_1$-$C_{12}$alkyl or $C_5$-$C_{12}$cycloalkyl, and $a_2$ is a number from 1 to 20;

(A-III)

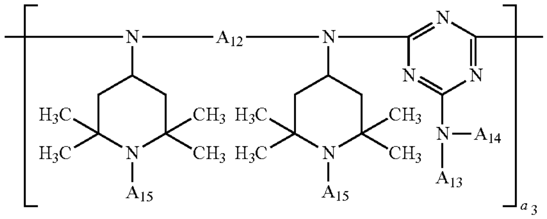

wherein $A_{12}$ is $C_2$-$C_{18}$alkylene, $C_5$-$C_7$cycloalkylene or $C_1$-$C_4$alkylenedi($C_5$-$C_7$cycloalkylene), $A_{13}$ and $A_{14}$ independently of one another are hydrogen, $C_1$-$C_{12}$alkyl, $C_5$-$C_{12}$cycloalkyl or a group of formula (a-2), (a-2)

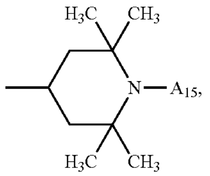

wherein $A_{15}$ independently of one another are hydrogen, $C_1$-$C_{12}$alkyl or $C_5$-$C_{12}$cycloalkyl or $A_{13}$ and $A_{14}$, together with the nitrogen atom to which they are bonded, form a 5- to 10-membered heterocyclic ring, and $a_3$ is a number from 2 to 20; and the light stabilizer (B) is at least one compound selected from the group consisting of a compound of formula (B-I), a compound of formula (B-II), a compound of formula (B-III) and a compound of formula (B-IV), (B-I)

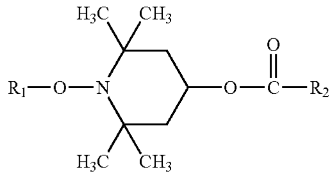

wherein $R_1$ is $C_1$-$C_{18}$alkyl, $C_1$-$C_{18}$hydroxyalkyl, cyclohexyl or hydroxycyclohexyl or $R_1$ is a group —$C(C_6H_5)(H)CH_2$—OH and $R_2$ is $C_1$-$C_{25}$alkyl;

(B-II)

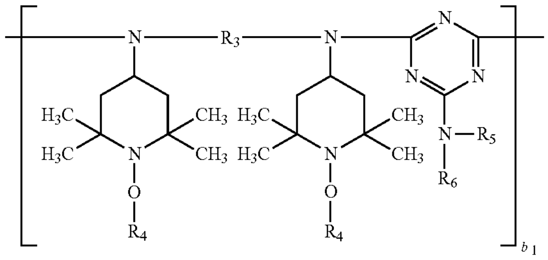

wherein $R_3$ is $C_2$-$C_{18}$alkylene, $C_5$-$C_7$cycloalkylene or $C_1$-$C_4$alkylenedi($C_5$-$C_7$cycloalkylene), $R_4$ independently of one another are $C_1$-$C_{12}$alkyl or $C_5$-$C_{12}$cycloalkyl, $R_5$ and $R_6$ independently of one another are hydrogen, $C_1$-$C_{12}$alkyl, $C_5$-$C_{12}$cycloalkyl or a group of formula (b-2), (b-2)

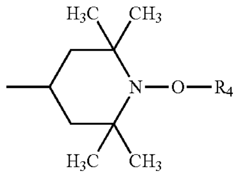

or $R_5$ and $R_6$, together with the nitrogen atom to which they are bonded, form a 5- to 10-membered heterocyclic ring and $b_1$ is a number from 1 to 20;

(B-III)

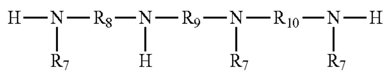

wherein $R_8$, $R_9$ and $R_{10}$ independently of one another are $C_2$-$C_{18}$alkylene and $R_7$ independently of one another are a group of formula (b-3)

(b-3)

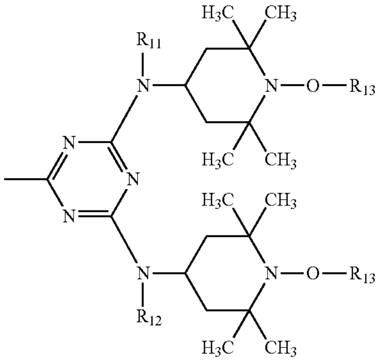

wherein $R_{11}$ and $R_{12}$ independently of one another are hydrogen, $C_1$-$C_{12}$alkyl, $C_5$-$C_{12}$cycloalkyl or a group of formula (b-4)

(b-4)

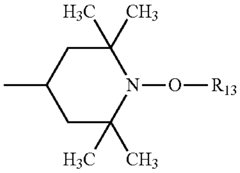

and $R_{13}$ independently of one another are $C_1$-$C_{12}$alkyl or $C_5$-$C_{12}$cycloalkyl;

(B-IV)

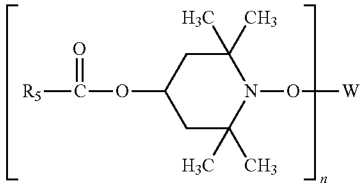

wherein $R_5$ is $C_1$-$C_{25}$alkyl, n is a number from 1 to 10, and

W is a wax residue comprising between 50 and 1000 carbon atoms.

15. The process according to claim 14, wherein water carry-over of the polyolefin film, tape, or monofilament from the water bath is reduced as compared to a light stabilized polyolefin film, tape or monofilament including the light stabilizer (A) and not including the light stabilizer (B).

* * * * *

UNITED STATES PATENT AND TRADEMARK OFFICE

CERTIFICATE OF CORRECTION

PATENT NO. : 10,689,495 B2
APPLICATION NO. : 15/551943
DATED : June 23, 2020
INVENTOR(S) : Daniel Mueller et al.

It is certified that error appears in the above-identified patent and that said Letters Patent is hereby corrected as shown below:

In the Specification

In Column 8, Lines 57-64 (approx.), delete " 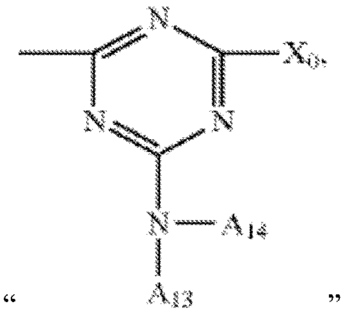 " and insert -- 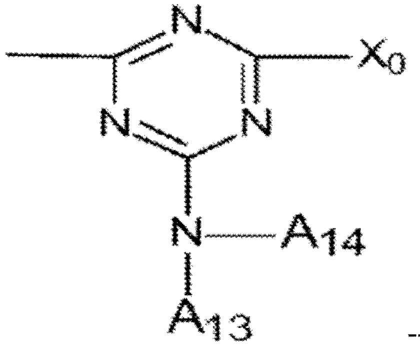 --, therefor.

In Column 9, Lines 14-15, delete "$N(C_1-C_8)alkyl)_2$" and insert -- $N(C_1-C_8\ alkyl)_2$ --, therefor.

In Column 9, Line 15, delete "$(C_1-C_0alkyl)$," and insert -- $(C_1-C_8\ alkyl)$, --, therefor.

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*

In Column 9, Lines 41-44 (approx.), after "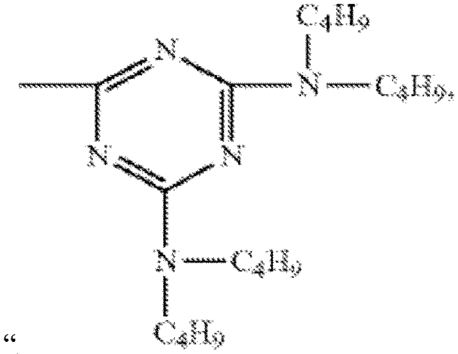" insert -- $E_2$ is --.

In Column 10, Lines 50-51 (approx.), delete "methyl¬pentyl," and insert -- methylpentyl, --, therefor.

In Column 10, Line 51, delete "dimethyl¬butyl," and insert -- dimethylbutyl, --, therefor.

In Column 10, Line 51, delete "methyl¬hexyl," and insert -- methylhexyl, --, therefor.

In Column 10, Line 52, delete "tetra¬imethyl¬butyl," and insert -- tetramethylbutyl, --, therefor.

In Column 10, Lines 52-53, delete "methyl¬heptyl," and insert -- methylheptyl, --, therefor.

In Column 10, Line 53, delete "methyl¬heptyl," and insert -- methylheptyl, --, therefor.

In Column 10, Line 53, delete "ethyl¬hexyl," and insert -- ethylhexyl, --, therefor.

In Column 10, Line 54, delete "tri¬methyl" and insert -- trimethyl --, therefor.

In Column 10, Line 54, delete "tetra¬methyl¬pentyl," and insert -- tetramethylpentyl, --, therefor.

In Column 10, Line 55, delete "methyl¬undecyl," and insert -- methylundecyl, --, therefor.

In Column 10, Line 56, delete "hexa¬methyl¬hexyl," and insert -- hexamethylhexyl, --, therefor.

In Column 10, Line 65, delete "decamethylenen" and insert -- decamethylene --, therefor.

In Column 13, Line 28 (approx.), delete "(A-Ill-1)," and insert -- (A-III-1), --, therefor.

In Columns 15 and 16, Lines 55-65 (approx.), delete
“ 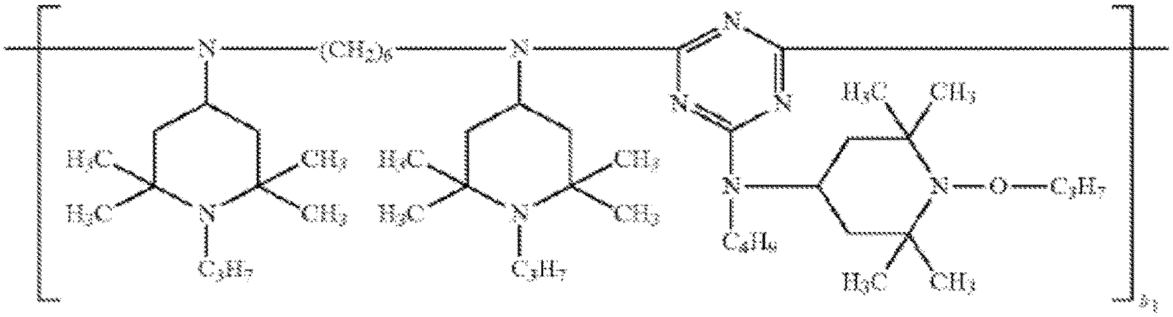 ”
and insert
-- 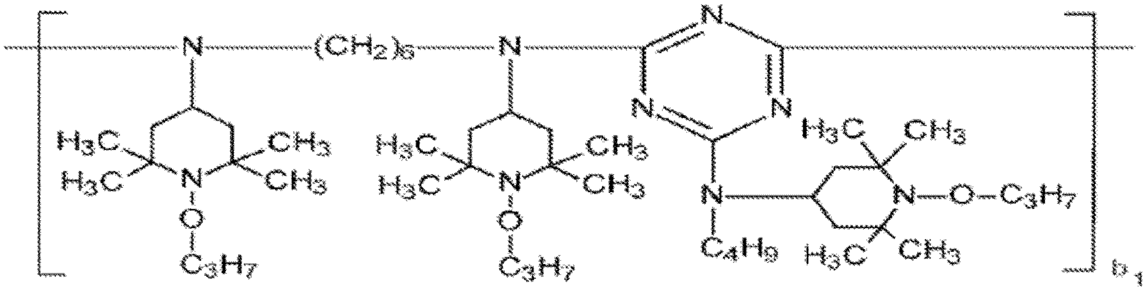 --,
therefor.
In Column 18, Lines 5-17 (approx.), below “ 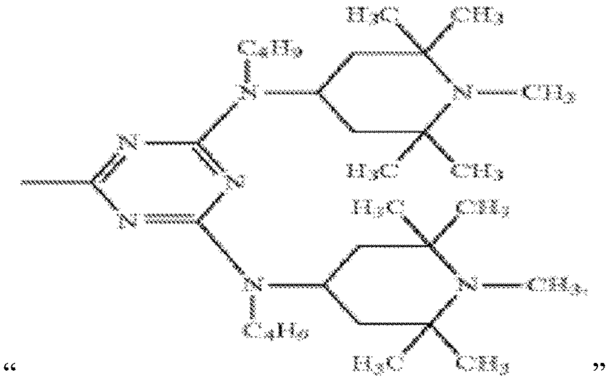 ” insert
-- 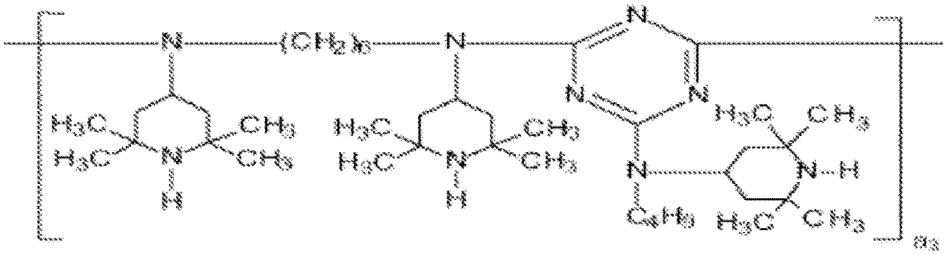 (A-III-2) --,
therefor.
In Column 19, Line 59, delete “(1” and insert -- (1' --, therefor.
In Column 19, Line 59, delete “1” and insert -- 1' --, therefor.

In Column 19, Lines 63-64, delete “didodecylthiomethyl” and insert -- di-dodecylthiomethyl --, therefor.

In Column 19, Line 64, delete “nonyl phenol.” and insert -- nonylphenol. --, therefor.

In Column 20, Lines 40-41, delete “methyl phenyl” and insert -- methylphenyl --, therefor.

In Column 20, Line 42, delete “methyl phenol,” and insert -- methylphenol, --, therefor.

In Column 20, Line 45, delete “hydroxyphenyhbutyrate],” and insert -- hydroxyphenyl)butyrate], --, therefor.

In Column 20, Line 55, delete “dimethylbenzyl mercaptoacetate,” and insert -- dimethylbenzylmercaptoacetate, --, therefor.

In Column 20, Line 56, delete “d i” and insert -- di --, therefor.

In Column 20, Line 56, delete “butyl benzylmercaptoacetate,” and insert -- butylbenzylmercaptoacetate, --, therefor.

In Column 20, Line 58, delete “dithioterephthelate,” and insert -- dithioterephthalate --, therefor.

In Column 20, Lines 58-59, delete “d i” and insert -- di --, therefor.

In Column 20, Line 59, delete “d i” and insert -- di --, therefor.

In Column 21, Line 21, delete “di-octadecyl3,5” and insert -- di-octadecyl-3,5 --, therefor.

In Column 21, Line 24, delete “ditert” and insert -- di-tert --, therefor.

In Column 21, Line 52, delete “poly-hydric” and insert -- polyhydric --, therefor.

In Column 22, Line 36, delete “(1,3'” and insert -- (1',3' --, therefor.

In Column 22, Line 45, delete “octyl-phenothiazines,” and insert -- octylphenothiazines, --, therefor.

In Column 22, Line 46, delete “octyl-phenothiazines,” and insert -- octylphenothiazines, --, therefor.

In Column 23, Line 3, delete “5'-(2-'” and insert -- 5'-2- --, therefor.

In Column 23, Line 37, delete “tetra(α-cyano” and insert -- tetra α-cyano --, therefor.

In Column 24, Line 67, delete “di methyl phenyl” and insert -- dimethylphenyl --, therefor.

In Column 25, Lines 15-16 (approx.), delete “dimethyl phenyl” and insert -- dimethylphenyl --, therefor.

In Column 25, Line 38 (approx.), delete "bis(2,4,6-tris(tert" and insert -- bis 2,4,6-tris(tert --, therefor.

In Column 26, Line 65-66, delete "tridecylnnitrone" and insert -- tridecylnitrone --, therefor.

In Column 27, Line 6 (approx.), delete "dimistryl" and insert -- dimyristyl --, therefor.

In Column 32, Lines 32-34 (approx.), delete

" $$\frac{WCO\ \text{activity of}\ 100\%\ (\alpha) + WCO\ \text{activity of}\ 100\%\ (\beta)}{3}$$ " and insert -- $$\frac{\text{WCO activity of 100 \% }(\alpha) + \text{WCO activity of 100 \% }(\beta)}{2}$$ --, therefor.

In the Claims

In Column 45, Lines 4-17 (approx.), Claim 3, delete

" 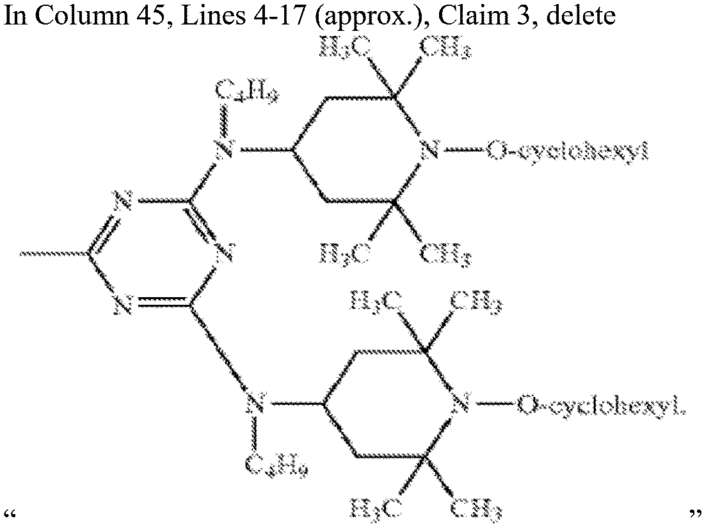 " and insert

-- 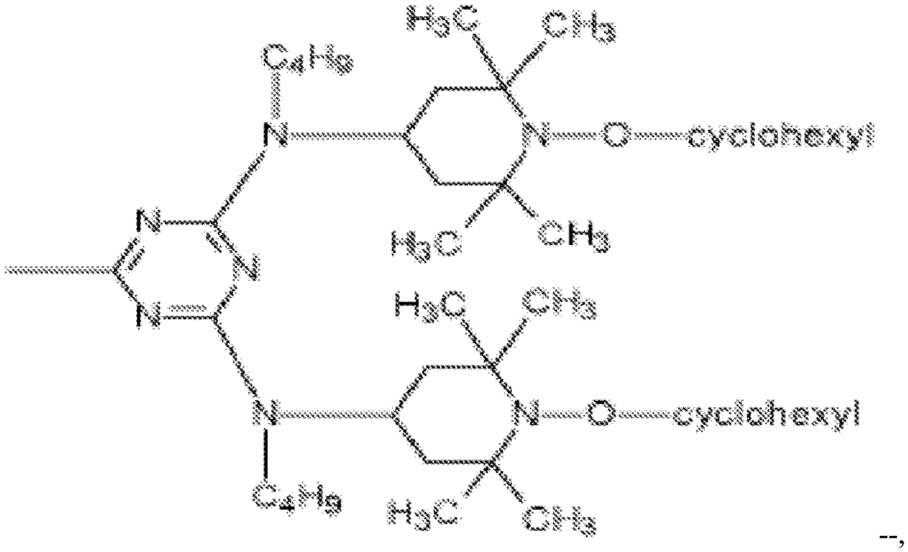 --, therefor.

In Column 47, Lines 42-55 (approx.), Claim 5, delete
“ 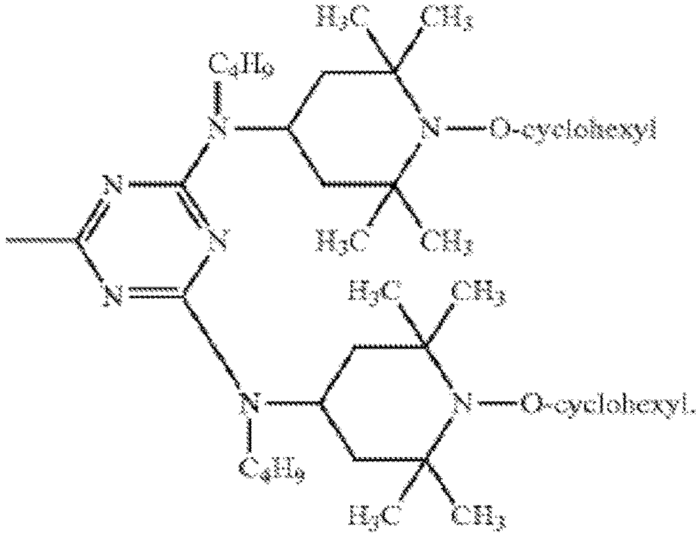 ” and
insert -- 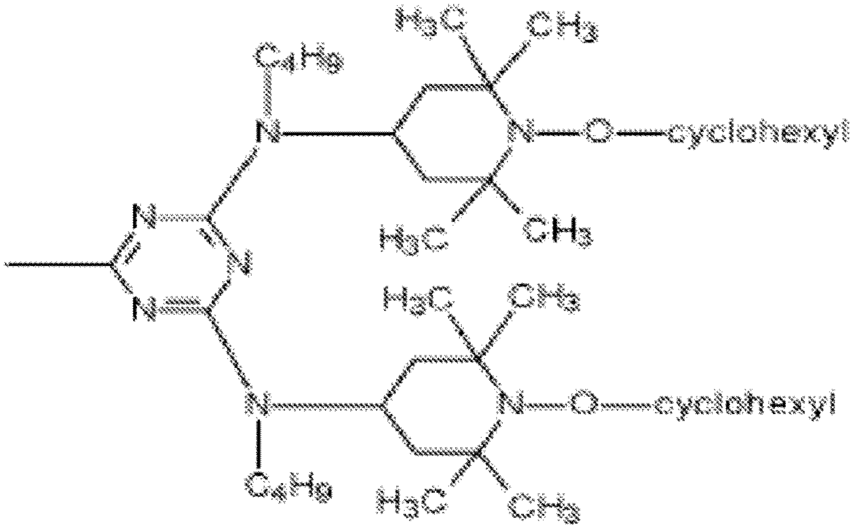 --, therefor.